United States Patent
Ziezold et al.

(10) Patent No.: US 10,733,219 B2
(45) Date of Patent: Aug. 4, 2020

(54) METHODS, DEVICES AND COMPUTER SOFTWARE FOR FACILITATING SEARCHING AND DISPLAY OF LOCATIONS RELEVANT TO A DIGITAL MAP

(71) Applicant: TOMTOM INTERNATIONAL B.V., Amsterdam (NL)

(72) Inventors: Hendrik Sebastian Ziezold, Amsterdam (NL); Simone Francine Tertoolen, Rotterdam (NL); Mathieu M. B. Doorduyn, Utrecht (NL); Marc Alexander Viddeleer, Almere (NL); Adrian Catalin Bogdan, Amsterdam (NL); Joost Cornelis Frederik Voogt, Utrecht (NL); Ruud Willemstein, Eemnes (NL); Martin Wolf, Veenendaal (NL); Maurits Hol, Amsterdam (NL); Michel de Boer, Loenen aan de Vecht (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 248 days.

(21) Appl. No.: 14/785,387

(22) PCT Filed: Apr. 17, 2014

(86) PCT No.: PCT/EP2014/057985
§ 371 (c)(1),
(2) Date: Oct. 19, 2015

(87) PCT Pub. No.: WO2014/170471
PCT Pub. Date: Oct. 23, 2014

(65) Prior Publication Data
US 2016/0098410 A1 Apr. 7, 2016

(30) Foreign Application Priority Data
Apr. 17, 2013 (GB) .................................. 1306942.2

(51) Int. Cl.
*G06F 16/332* (2019.01)
*G06F 16/9537* (2019.01)
(Continued)

(52) U.S. Cl.
CPC ...... *G06F 16/3322* (2019.01); *G01C 21/3611* (2013.01); *G01C 21/3614* (2013.01);
(Continued)

(58) Field of Classification Search
None
See application file for complete search history.

(56) References Cited

U.S. PATENT DOCUMENTS 6,564,213 B1 * 5/2003 Ortega ................ G06F 16/3322
6,587,787 B1    7/2003 Yokota
(Continued)

FOREIGN PATENT DOCUMENTS

CN      101382438 A    3/2009
EP        2042891 A2    4/2009
(Continued)

OTHER PUBLICATIONS

International Search Report of International Application No. PCT/EP2014/057986 dated Aug. 4, 2014.
(Continued)

*Primary Examiner* — Apu M Mofiz
*Assistant Examiner* — Farhad Agharahimi

(57) ABSTRACT

A portable electronic device is disclosed comprising: data processing means; data repository containing data records representative of locations relevant to or within a digital map; and display means. The device further comprises means for monitoring a free text search string as it is input by a user of the device; querying the data repository for matching records and generating suggestions selectable by a user to adjust the search, based on the search string as it is (Continued)

input; displaying at least some of any matching records and suggestions on the display; and, in response to receipt of user input indicating a selection of a matching suggestion, adjusting the search accordingly.

19 Claims, 14 Drawing Sheets

(51) Int. Cl.
    *G06F 16/2457*     (2019.01)
    *G01C 21/36*     (2006.01)
    *G06F 16/33*     (2019.01)

(52) U.S. Cl.
    CPC ... *G01C 21/3682* (2013.01); *G06F 16/24578* (2019.01); *G06F 16/3335* (2019.01); *G06F 16/9537* (2019.01)

(56) References Cited

U.S. PATENT DOCUMENTS

| | | | |
|---|---|---|---|
| 6,775,666 B1 * | 8/2004 | Stumpf | G06F 16/3334 |
| 8,001,064 B1 | 8/2011 | Rennison | |
| 8,060,510 B2 | 11/2011 | Ghanekar et al. | |
| 8,315,791 B2 | 11/2012 | Bales et al. | |
| 8,335,990 B2 | 12/2012 | Arrasvuori | |
| 8,370,058 B2 | 2/2013 | Waeller et al. | |
| 8,645,825 B1 * | 2/2014 | Cornea | G06F 17/276 |
| | | | 715/257 |
| 2004/0243307 A1 | 12/2004 | Geelen | |
| 2005/0060286 A1 | 3/2005 | Hansen et al. | |
| 2005/0210021 A1 | 9/2005 | Miyazaki et al. | |
| 2005/0234904 A1 * | 10/2005 | Brill | G06F 16/334 |
| 2005/0251334 A1 | 11/2005 | Mizuno | |
| 2006/0026170 A1 * | 2/2006 | Kreitler | G06F 16/9537 |
| 2006/0089792 A1 * | 4/2006 | Manber | G01C 21/3644 |
| | | | 701/408 |
| 2007/0005324 A1 | 1/2007 | Gong et al. | |
| 2008/0263023 A1 * | 10/2008 | Vailaya | G06F 16/148 |
| 2009/0112848 A1 * | 4/2009 | Kunjithapatham | |
| | | | G06F 16/7867 |
| 2009/0216732 A1 * | 8/2009 | Feng | G01C 21/3611 |
| 2010/0075643 A1 | 3/2010 | Cooper et al. | |
| 2010/0106399 A1 | 4/2010 | Waeller et al. | |
| 2010/0211909 A1 | 8/2010 | Ghanekar et al. | |
| 2011/0047509 A1 | 2/2011 | Arrasvuori | |
| 2011/0063301 A1 | 3/2011 | Setlur | |
| 2011/0153364 A1 | 6/2011 | Kerr et al. | |
| 2011/0153654 A1 | 6/2011 | Lee | |
| 2011/0175928 A1 | 7/2011 | Hashimoto | |
| 2011/0196602 A1 | 8/2011 | Pfeifle et al. | |
| 2011/0313649 A1 | 12/2011 | Bales et al. | |
| 2012/0011463 A1 * | 1/2012 | Payne | G01C 21/3611 |
| | | | 715/780 |
| 2012/0158289 A1 | 6/2012 | Bernheim Brush | |
| 2013/0035851 A1 | 2/2013 | Zhang | |
| 2013/0080469 A1 * | 3/2013 | Choi | G06F 3/0485 |
| | | | 707/772 |
| 2013/0132398 A1 * | 5/2013 | Pfeifle | G06F 16/29 |
| | | | 707/745 |
| 2013/0321466 A1 * | 12/2013 | Kocienda | G01C 21/26 |
| | | | 345/635 |
| 2014/0207748 A1 * | 7/2014 | Sood | G06F 16/9537 |
| | | | 707/706 |

FOREIGN PATENT DOCUMENTS

| | | |
|---|---|---|
| EP | 2420799 A1 | 2/2012 |
| JP | H06314297 | 11/1994 |
| JP | 2001134579 | 5/2001 |
| JP | 2002098544 A | 4/2002 |
| JP | 2004021539 | 1/2004 |
| JP | 2004233711 | 8/2004 |
| JP | 2006162323 | 6/2006 |
| JP | 2007310734 A | 11/2007 |
| JP | 2008250565 A | 10/2008 |
| JP | 2008304324 | 12/2008 |
| JP | 2009134463 | 6/2009 |
| JP | 2009266073 | 11/2009 |
| JP | 2010092357 | 4/2010 |
| JP | 2010225035 A | 10/2010 |
| JP | 2010286870 | 12/2010 |
| JP | 2011247832 | 12/2011 |
| WO | 2010004612 | 1/2010 |

OTHER PUBLICATIONS

Anonymous: Don't Panic viaGPS 4.0—User Manual; A Turn-by-turn Navigation System for GPS Devices by mireo, 2011, pp. 1-63, Retrieved from the Internet: URL:http://www.mireo.hr/images/pdfs/Mireo_DP_User_Manual.pdf [retrieved on Jul. 30, 2014] p. 21-p. 26 XP055132371.

International Search Report of International Application No. PCT/EP2014/057985 dated Aug. 8, 2014.

Partial International Search Report of International Application No. PCT/EP2014/057987 dated Aug. 18, 2014.

International Search Report of International Application No. PCT/EP2014/057987 dated Nov. 21, 2014.

Written Opinion of the International Search Authority dated Aug. 4, 2014.

Letter of Applicant Nov. 8, 2016.

* cited by examiner

| POI name | Full Address | Country |
|---|---|---|
| starbucks | Zurichstrasse 1 | 6004 Luzern | CHE |
| starbucks | Aarefeldstrasse 16 | 3500 Thun | CHE |
| starbucks | Bahnhofplatz 2 | 9000 Sankt Gallen | CHE |
| starbucks switzerland | industriestrasse 27 | 8504 Volketswil | CHE |
| starbucks | Waaghausgasse 18 | 3011 Bern | CHE |
| starbucks | Altstellerstrasse 147 | 8048 Zurich | CHE |
| starbucks | Kasinostrasse | 5000 Aarau | CHE |
| starbucks | Route de l'Aeroport 13 | 1215 Meyrin | CHE |
| starbucks france | Rue de la Republique 17 | 13002 2eme Arrondissement Marseille | FRA |
| starbucks | Aeschenplatz 7 | 4052 Basel | CHE |
| starbucks deutschland | Thomas-Dehler-Straße 12 | 81737 Munchen | DEU |
| starbucks house | Sendlinger Straße 27 | 80331 Munchen | DEU |
| starbucks house | Rosental 7 | 80331 Munchen | DEU |
| starbucks deutschland | Bayerstraße 10 a | 80335 Munchen | DEU |
| starbucks house | Schutzenstraße 8 | 80335 Munchen | DEU |
| starbucks deutschland | Platzl 3 | 80331 Munchen | DEU |
| starbucks house | Residenzstraße 7 | 80333 Munchen | DEU |
| starbucks deutschland | Odeonsplatz 16 | 80539 Maxvorstadt | DEU |
| starbucks house | Leopoldstraße 56 | 80802 Munchen | DEU |
| starbucks house | Humboldtstraße 2 | 79098 Freiburg im Breisgau | DEU | ranking set 1  
20 items 1301 (Full Address)  
1303a (Country)

Figure 14A

| POI name | Full Address | | Country |
|---|---|---|---|
| starbucks house | Kaiser--Joseph-Straße 165 | 79098 Freiburg im Breisgau | DEU |
| starbucks deutschland | Bismarckallee 5 | 79098 Freiburg im Breisgau | DEU |
| starbucks france | Avenue Henri Barbusse 22 | 69100 Villeurbanne | FRA |
| starbucks | Rue de la Republique 64 | 69002 2eme Arrondissement Lyon | FRA |
| starbucks france | Rue de la republique 2 | 69001 1er Arrondissement Lyon | FRA |
| starbucks deutschland | Pliersaustraße 8 | 73728 Esslingen am Neckar | DEU |
| starbucks house | Konigstraße 44 | 70173 Stuttgart | DEU |
| starbucks house | Arnulf-Klett-Platz 2 | 70173 Stuttgart | DEU |
| starbucks deutschland | Heinkelstraße 11 | 71634 Ludwigsburg | DEU |
| starbucks house | Kilianstraße 6 | 74072 Heilbronn | DEU |
| starbucks house | Kaiserstraße 185 | 76133 Karlsruhe | DEU |
| starbucks house | Karolinenstraße 12 | 90402 Nurmberg | DEU |
| starbucks house | Hauptstraße 25 | 69117 Heidelberg | DEU |
| starbucks deutschland | Numberger Dtraße 7 | 91052 Erlangen | DEU |
| starbucks house | O7 18 A | 69161 Mannheim | DEU |
| starbucks house | H1 16 | 69159 Mannheim | DEU |
| starbucks house | Robert-Schumann-Straße 2 | 68519 Viernheim | DEU |
| starbucks deutschland | Trierer Straße 1 | 65111 Saarbrucken | DEU |
| starbucks austria fil 1070 wien | Neubaugasse 4 | 1070 7. Bezirk Neubau | AUT |
| starbucks osterreich | Theobaldgasse 20/1 | 1060 6. Bezirk Mariahilf | AUT |

METHODS, DEVICES AND COMPUTER SOFTWARE FOR FACILITATING SEARCHING AND DISPLAY OF LOCATIONS RELEVANT TO A DIGITAL MAP

CROSS-REFERENCE TO RELATED APPLICATIONS

The present application is a National Stage of International Application No. PCT/EP2014/057985, filed Apr. 17, 2014 and designating the United States, which claims benefit to United Kingdom Patent Application No. GB1306942.2 filed on Apr. 17, 2013. The entire content of these applications are incorporated herein by reference.

FIELD OF THE INVENTION

The present document discloses methods, devices and computer software for facilitating searching and display of locations relevant to a digital map. In particular, the present document discloses methods, devices and computer software for searching a data repository of locations based on a user-input free text search string. The present document also discloses methods, devices and computer software for facilitating a user in searching a data repository of locations, by generating and displaying selectable search suggestions based on a user input free text search string. The present document also discloses methods, devices and computer software for providing, on a representation of a digital map displayed on the display, graphical user interface (GUI) elements of different prominence levels to facilitate a user in reviewing a plurality of locations representing, for example, a set of results of a destination search, a set of current traffic incidents, and so forth. The various aspects of the disclosure all find particular utility in navigation apparatus in the form of portable electronic devices such as smart phones, portable navigation devices, so-called PNDs, and to navigation apparatus which form part of an integrated navigation system, e.g. an in-vehicle navigation system.

BACKGROUND TO THE INVENTION

Electronic devices such as smart phones, portable navigation devices (PNDs) and integrated navigation systems that include GNSS (global navigation satellite systems), such as GPS, signal reception and processing functionality are widely employed as personal, in-car or other vehicle navigation systems. In general terms, a known electronic device having navigation functionality comprises a processor, memory (at least one of volatile and non-volatile, and commonly both), and digital map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max, GSM, and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). In known devices, these locations can be input by a user of the device, by any of a wide variety of different methods, for example by postcode, street name and house number, name, etc. In some known navigation devices, navigable destinations are stored locally in a data repository as library of data records representative of locations relevant to a digital map. For locations that represent navigable destinations, location information, such as latitude and longitude or a distance along a path between nodes in the digital map, may be stored to allow the destination to be located, and a navigable route to that location to be generated.

Typically, location data records for navigable destinations may represent addresses having components (or data fields) including house number, street name, settlement name, country and postal code that together define a specific address. Location data records for destinations may also represent previously stored manufacturer-supplied or user-generated points of interest (POIs), which may be "well known" destinations (such as famous locations, municipal locations (such as sports grounds or swimming baths) or other points of interest such as restaurants, bars, shops, etc. POI data records may have components including one or more of the POI name (e.g. "British Museum"), POI brand name (e.g. "Starbucks"), POI category name and/or category code (e.g. "restaurant" and "7315") and POI address (including house number, street name, settlement name, postal code and country). Data records may also be stored for favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone, smart phone or the like, and in these cases, the normal functionality of the hand-held system is extended by means of the installation of software on the device to perform both route calculation and navigation along a calculated route.

It is possible for a mobile device to be in wireless communication with a fixed terminal. The data storage and processing required to determine a destination and route could be performed in the fixed terminal with the mobile device transmitting the user input information to the fixed terminal and receiving information for displaying to a user of the mobile device from the fixed terminal. However, such an implementation requires a wireless connection to the mobile device, as well a minimum bandwidth for the information transfer, and neither of these can be ensured in all locations.

Accordingly, when a navigation device is a mobile device, the mobile device is required to store a large database of geographical information and to perform the searching of the database using the limited processing resources of the mobile device. In known navigation devices, a destination, such as an address or a POI, is searched for within a database of geographical information, in this case a data repository of data records representing locations relevant to a digital map, using a guided search.

A guided search uses prompts to request specific types of information from a user. The user's responses to each prompt allow a reduced search space to be defined for subsequent searches until a search result corresponding to the desired destination of a user is reached. Since each search space is smaller than the entire database of geographical information, the mobile device does not experience the problem of having to search the entire database of geographical information with its limited processing capability.

FIG. 5 shows an example of known a guided search process 500. The process begins at decision point 501 where the device prompts a user to input a selection of whether to search for an address or a point of interest (POI). If the user selects to search for an address, the user then receives three further prompts to input the name of a city 502, a street 503 within the city and a house number 504. If the user instead selects to search for a POI, the user is prompted to input the name of a city 505 and then to input a selection 506 of whether to search for a POI category 507 or POI name 508. The user then receives further prompts to input the POI category and/or POI name depending on the user selection. These searches iteratively narrow the search space by searching against specific components of the data records in relation to which the user is prompted for input, and filtering out those that do not have a component value that matches the user input.

Problems experienced by guided searches are that the plurality of prompts result in the device being slow and difficult to use. It is not sufficient for a user to provide information defining a desired destination with a single input to the device. In addition, a user may be unable to find a desired destination due to having incomplete information, or having information that does not tally exactly with the desired data record. Thus the user cannot easily speculatively search the database of geographical information to find a desired destination.

An alternative to performing a guided search is to perform a free text search. A free text search aims to determine the desired destination of a user from a single user input, thereby avoiding the plurality of prompts required to perform a guided search.

On such example of a free text searching technique for a navigation device is disclosed in WO 2010/119137 A1. The search is based upon a trie that associates names of geographical objects to collections of map tiles. A digital map is quadtree partitioned on a plurality of hierarchical levels. In order to reduce a search space so that a large database can be efficiently searched with the limited processing resources of the mobile device, a first search is performed at a level within the trie. If the number of candidate tiles exceeds a predetermined number, the search space is reduced by compacting some or all of the tiles in the candidate set to a next level tile. Accordingly, mobile device is not required to directly search spaces larger than a predetermined size.

However, a problem with the above-described free text search technique is that the mobile device is required to perform the processing required to reduce the search space after candidate results have been obtained. This processing to change the search space increases the processing requirements and slows down the retrieval of search results.

It is known in the art of PNDs to, besides a list view of search results, also provide a map view in which graphical user interface (GUI) elements are used to indicate locations of the results of a destination search, or weather events or traffic incidents. This can facilitate a user in contextually visualising the locations in relation to a digital map. However, showing these locations in a manner that is particularly usable and easily understandable to the user is problematic, as there can be too much or too little location information displayed, with too much or too little functionality, which may diminish the user experience and limit the ease of use of the device for selecting a destination to route to, or to effectively take into account relevant weather and traffic events.

SUMMARY OF THE DISCLOSURE

Embodiments of the invention provide methods, devices and computer software that are intended to address at least some of the above-described limitations in known navigation tools.

In particular, the present document discloses methods, devices and computer software for searching a data repository of locations based on a user-input free text search string. These aspects of the disclosure will now be summarised as follows.

Viewed from one aspect, there is provided a portable electronic device comprising: data processing means; data repository containing: data records representative of locations relevant to or within a digital map; and data representative of an index associating words contained in the data records with the records in which those words appear; the portable electronic device also comprising computer readable medium comprising instructions which when executed by the data processing means cause the electronic device, in relation to a received search query including a search string, to: process the search string to provide one or more search words; query the index to identify data records containing the or each search word; and generate a rank for each of the one or more identified data records indicative of the relevance of each identified data record to the search query.

In accordance with this aspect, the user of the device is provided with a flexible search that is responsive and quick, even though the mobile device has to search a large repository of data using relatively low processing capabilities. In addition, the user can search a larger range of data more speculatively, without being bound by a restrictive guided search procedure, making the user more likely to find a desired location result.

The search query may be derived from user input of the electronic device, and the instructions may further cause the device to display the results on a display of the device.

The instructions may further cause the electronic device, when processing the search string, to perform one or more of: splitting the search string into words; normalising the words; identifying and treating special words.

Normalising the words may include one or more processing steps intended to account for irregularities in the content of the search string, optionally including one or more of: converting all letters to lower case; removing accents from letters; replacing a sequence of the same letter by a single letter; replacing single letters with other letters; replacing words and abbreviations with standard abbreviations. The index may contain normalised versions of the words contained in the data records and the search string may be processed to normalise the words contained therein using the same normalisation rules used in the generation of the index.

By normalising the words, the search procedure becomes more versatile and tolerant of user errors, such as typographical and recall errors, and variations in spelling. Normalisation also reduces the size of the indexes to be searched, further accelerating the search process.

Identifying and treating special words may include one or more of: converting country names and codes to standard country codes; removing house numbers; identifying words that correspond to categories of points of interest (POI), and replacing with a POI category code. If the full search string is a POI category name or a prefix of a single POI category name, the query is preferably for records in the POI category. If the full search string includes more than one word and starts with a POI category name, two queries are preferably produced as follows: a first query in which the POI category name is provided as a search word; a second query in which the POI category name is replaced by a POI category code.

The instructions may further cause the electronic device, when querying the index to identify data records containing the or each search word, to: for each search word, find the set of matching records from the index; and determine the intersection of the sets of records to provide the records that match all words.

The instructions may further cause the electronic device, when generating a rank for each data record, to: calculate a score for each record; rank the records based on their scores; if two records have the same score, reconcile their rank ordering based on a distance from a search centre if available, otherwise the rank order if the two records is random.

Calculating a ranking score for each record may include starting from a starting score and performing one or more of: subtract a penalty from the score for each word contained in the search string not exactly matched to a word contained in the data record; subtract a penalty from the score for a structural difference between the search words arranged in the search string and how the words appear in the data record, including incorrect word order and word gaps; subtract a penalty from the score for each unmatched word contained in a component for which there is a word matching a search word; add a bonus to the score for data records indicated as important matches.

Calculating a ranking score for a record representing an address may include one or more of: not ranking the data record if there is no search word matched against a word in the index contained in the street name of the data record; if there is a search centre, adjusting one or more of the penalties to: suppress penalties for data records relatively near to the search centre, or increase penalties for data records relatively distant to the search centre, or both; add a bonus to the score if there is a word match with a centre of settlement, dependent on the size of the centre of settlement and a distance of the centre of settlement from a search centre, if available.

Calculating a ranking score for a record representing a point of interest (POI) may include one or more of: not ranking the data record if there is no search word matched against a word in the index contained in the one of the components of the data record representing the name of the POI, the brand name of the POI or the POI category; if there is a search centre, not subtracting a penalty from the score for each unmatched word contained in a component for which there is a word matching a search word; if there is no search centre, subtracting a penalty from the score for each unmatched word contained in a component of the data record representing the name of the POI or the brand name of the POI for which there is a word matching a search word; if there is no search centre, subtracting a penalty from the score if there is no search word matched against a word in the index contained in the name of the POI or the brand name of the POI.

By ranking the matching data records, the user can be presented with the records deemed most relevant to the search in rank order. This helps to ensure that the user is presented with the most relevant matching data records first, i.e. at the top of a list. It also facilitates the effective display of the search results in a map view, as will be described in more detail below.

The data records (or documents) may represent either an address or a Point of interest (POI). The data records may contain data representative of one or more of the following components: street name; place name; postal code; country code; POI name; POI brand name; POI address; POI category code. The data representative of the components may comprise the location related information itself, e.g. one or more of a street name, place name, postal code, country code, POI name, POI brand name, POI address, POI category code. In preferred embodiments, however, the data representative of the components may comprise a reference or pointer to the location related information stored in a digital map. This latter embodiment allows the size of each data record to be kept to a minimum, which is beneficial given the memory constraints typically found on mobile devices.

Each data record or document may comprise a record identifier, e.g. allowing each data record to be uniquely identified. Additionally, or alternatively, each data record may comprise a location reference. The location reference preferably identifies a portion of the geographic area represented by the digital map, such that, when performing a search of locations within a particular geographic region, only those data records within the particular geographic region need to be searched. The location reference may be provided as a Morton code, thereby allowing a two dimensional geographic region of the digital map to be represented in one dimension.

The location reference may form part of the record identifier. For example, in embodiments, the record identifier for each data record comprises a first portion and a second portion: the first portion being a location reference, e.g. a Morton code representative of a geographic area containing the location (represented by the data record); and the second portion being a reference or pointer to the location related information for the data record stored in an associated digital map.

Data records representing different types of location may be stored in separate databases in the repository and may be indexed in separate free text indices. For example, addresses, POIs, recent locations and favourite locations may be store in separate databases and have separate free text indices than need to be queried separately during the search.

The index, which preferably acts as a reverse look-up table, may include tuples one for each word of the set of words contained in the components relating each of said words to the respective record identifiers of all the records in which those words appear.

The search string may be derived from a single field free-text string input by the user by a user interface of the device.

Viewed from another aspect, there is provided a method of operating a portable electronic device comprising data processing means, data repository containing data records representative of locations relevant to or within a digital map and data representative of an index associating words contained in the data records with the records in which those words appear, the method comprising, in relation to a received search query including a search string: processing the search string to provide one or more search words; querying the index to identify data records containing the or each search word; and generating a rank for each of the one or more identified data records indicative of the relevance of each identified data record to the search query.

The above-described method may optionally be adapted or include further steps so as to operate the portable electronic device in accordance with the above-described aspects.

Viewed from another aspect, there is provided a computer software product comprising instructions which when executed by data processing means of a portable electronic device cause the electronic device to be configured to carry out the above-described methods. The computer software product may be embodied as a computer readable medium, optionally a non-transient computer readable medium.

The present document also discloses methods, devices and computer software for facilitating a user in searching a data repository of locations, by generating and displaying selectable search suggestions based on a user input free text search string. These aspects of the disclosure will now be summarised as follows.

Viewed from one aspect, the present disclosure provides a portable electronic device comprising: data processing means; data repository containing data records representative of locations relevant to or within a digital map; display means; and computer readable medium comprising instructions for facilitating a user in searching the data records which when executed by the data processing means cause the electronic device to: monitor a free text search string as it is input by a user of the device; based on the search string as it is input: query the data repository for matching records; and generate suggestions selectable by a user to adjust the search; display at least some of any matching records and suggestions on the display; and in response to receipt of user input indicating a selection of a matching suggestion, adjust the search accordingly.

By providing suggestions selectable to adjust the parameters of a user search, the suggestions being based upon a free text search string, a degree of feedback is provided to the user and the search process is sped up and made more flexible for a user.

Address suggestions may be generated based on the street and/or settlement names of data records representing addresses matched with the search string. Selection of an address suggestion containing a settlement name may adjust the search centre to correspond to that settlement. Selection of an address suggestion containing a street name may replace the search string with the street name. After selection of an address suggestion containing a street name and settlement name, the user may be prompted to input a house number into the free text search string.

Point of interest (POI) suggestions may be generated based on the names, categories and synonyms of categories of data records representing points of interest matched with the search string. Selection of a POI suggestion may filter the data records returned by the query to include only those having a POI name, category or synonymous POI category matching that of the POI suggestion.

The data repository may be queried for matching data records and suggestions may be generated in response to each keystroke or other user input to adapt the search string or search centre, and each selection of a suggestion, the display may be thereafter updated to display any matching data records and generated suggestions. In this way, the search is responsive to user input effectively in real-time.

The data repository may further include data representative of an index associating words contained in the data records with the records in which those words appear; and the instructions may further cause the electronic device to process the search string as it is input to provide one or more search words; wherein, based on the search string as it is input, querying the data repository for matching records may include querying the index to identify data records containing the or each search word.

The instructions may further cause the electronic device to generate a rank for each of the one or more identified data records indicative of the relevance of each identified data record to the search query. The matching data records may be displayed in an ordered list according to said rank.

The instructions may further cause the electronic device, when processing the search string, to perform one or more of: splitting the search string into words; normalising the words; identifying and treating special words.

Normalising the words may include one or more processing steps intended to account for irregularities in the content of the search string, optionally may include one or more of: converting all letters to lower case; removing accents from letters; replacing a sequence of the same letter by a single letter; replacing single letters with other letters; replacing words and abbreviations with standard abbreviations. The index may contain normalised versions of the words contained in the data records and the search string may be processed to normalise the words contained therein using the same normalisation rules used in the generation of the index.

Identifying and treating special words includes one or more of: converting country names and codes to standard country codes; removing house numbers; identifying words that correspond to categories of points of interest (POI), and replacing with a POI category code. If the full search string is a POI category name or a prefix of a single POI category name, the query may be for records in the POI category. If the full search string includes more than one word and starts with a POI category name, two queries may be produced as follows: a first query in which the POI category name is provided as a search word; a second query in which the POI category name is replaced by a POI category code.

The instructions may further cause the electronic device, when querying the index to identify data records containing the or each search word, to: for each search word, find the set of matching records from the index; and determine the intersection of the sets of records to provide the records that match all words.

The instructions may further cause the electronic device, when generating a rank for each data record, to: calculate a score for each record; ranking the records based on their scores; if two records have the same score, reconcile their rank ordering based on a distance from a search centre if available, otherwise the rank order if the two records is random.

Calculating a ranking score for each record may include starting from a starting score and performing one or more of: subtracting a penalty from the score for each word contained in the search string not exactly matched to a word contained in the data record; subtracting a penalty from the score for a structural difference between the search words arranged in the search string and how the words appear in the data record, including incorrect word order and word gaps; subtracting a penalty from the score for each unmatched word contained in a component for which there is a word matching a search word; adding a bonus to the score for data records indicated as important matches.

Calculating a ranking score for a record representing an address may include one or more of: not ranking the data record if there is no search word matched against a word in the index contained in the street name of the data record; if there is a search centre, adjusting one or more of the penalties to: suppress penalties for data records relatively near to the search centre, or increase penalties for data records relatively distant to the search centre, or both; add a bonus to the score if there is a word match with a centre of settlement, dependent on the size of the centre of settlement and a distance of the centre of settlement from a search centre, if available.

Calculating a ranking score for a record representing a point of interest (POI) may include one or more of: not ranking the data record if there is no search word matched against a word in the index contained in the one of the components of the data record representing the name of the POI, the brand name of the POI or the POI category; if there is a search centre, not subtracting a penalty from the score for each unmatched word contained in a component for which there is a word matching a search word; if there is no search centre, subtracting a penalty from the score for each unmatched word contained in a component of the data record representing the name of the POI or the brand name of the POI for which there is a word matching a search word; if there is no search centre, subtracting a penalty from the score if there is no search word matched against a word in the index contained in the name of the POI or the brand name of the POI.

The data records (or documents) may represent either an address or a Point of interest (POI). The data records may contain data representative of one or more of the following components: street name; place name; postal code; country code; POI name; POI brand name; POI address; POI category code. The data representative of the components may comprise the location related information itself, e.g. one or more of a street name, place name, postal code, country code, POI name, POI brand name, POI address, POI category code. In preferred embodiments, however, the data representative of the components may comprise a reference or pointer to the location related information stored in a digital map. This latter embodiment allows the size of each data record to be kept to a minimum, which is beneficial given the memory constraints typically found on mobile devices. The matching data records representing addresses may be displayed in a first column and the matching data records representing points of interest may be displayed in a second column adjacent the first column.

The portable electronic device may further comprise user input means including a touch screen overlay on said display, wherein selection of a displayed record returned by the query of the data records or of a generated suggestion may comprise a touch in relation to the displayed record or suggestion or a GUI element representative thereof.

Viewed from another aspect, there is provided a method of operating a portable electronic device comprising data processing means, data repository containing data records representative of locations relevant to or within a digital map, and display means, the method comprising: monitoring a free text search string as it is input by a user of the device; based on the search string as it is input: querying the data repository for matching records; and generating suggestions selectable by a user to adjust the search; displaying at least some of any matching records and suggestions on the display; and in response to receipt of user input indicating a selection of a matching suggestion, adjusting the search accordingly.

The above-described method may optionally be adapted or include further steps so as to operate the portable electronic device in accordance with the above-described aspects.

Viewed from another aspect, there is provided a computer software product comprising instructions which when executed by data processing means of a portable electronic device cause the electronic device to be configured to carry out the above-described methods. The computer software product may be embodied as a computer readable medium, optionally a non-transient computer readable medium.

The present document also discloses methods, devices and computer software for providing, on a representation of a digital map displayed on the display, GUI elements of different prominence levels to facilitate a user in reviewing a plurality of locations representing, for example, a set of results of a destination search, a set of current traffic incidents, and so forth. These aspects of the disclosure will now be summarised as follows.

Viewed from one aspect, there is provided a portable electronic device comprising: data processing means; data repository containing data representative of a digital map; display means; computer readable medium comprising instructions which when executed by the data processing means cause the electronic device, in relation to data representative of a plurality locations relevant to the digital map, to: provide, on a representation of the digital map displayed on the display, for each of the locations, one of a plurality of different graphical user interface (GUI) elements characterised by different prominence levels to indicate the locations, wherein the prominence level of the GUI element used for each location is dependent on the level of detail at which the digital map is displayed and a deemed relevance of that location to a user query.

In this way, a user is provided with a contextual view of a plurality of locations deemed relevant to a query in such a way that a large number of results are visible without the view becoming cluttered, and so that the prominence of the indicator for each location indicates the relevance of the location and is dependent on the level of detail in which the digital map is displayed.

GUI elements at increased prominence levels may provide one or more of: increased visual prominence in the display; increased opacity; increased information relevant to the location; increased user interface functionality enabling user interaction therewith.

At a given level of detail, GUI elements having a relatively low prominence level may be used to indicate locations of the plurality of locations deemed less relevant to the user query, whereas GUI elements having a relatively high prominence level may be used to indicate locations of the plurality of locations deemed more relevant to the user query.

When the level of detail at which the digital map is displayed is increased or decreased, the GUI element used to indicate a given location may be changed to an available higher or lower prominence level, respectively. Thus when the map is zoomed in, more results may be shown at higher prominence levels, and vice versa.

For any given level of detail, a minimum number of the plurality of locations may be indicated by the GUI element having the highest prominence level.

When the digital map is displayed at a relatively high level of detail, a relatively large number of the plurality of locations may be indicated using GUI elements having relatively high prominence levels. When the digital map is displayed at a relatively low level of detail, a relatively large number of the plurality of locations may be indicated using GUI elements having relatively low prominence levels.

The locations may be divided into groups by their relevance to the user query, and each group may be associated with a respective level of detail for the digital map. The grouping of the locations and the assignation of the associated respective levels of details to those groups may be performed based on one or more of: the number of the locations; the distribution of the locations; the deemed relevance of the locations to the user query; the level of detail required to contain possible groupings of the locations in a minimum bounding box; the range of levels of detail to the maximum possible; a set number of locations in the most relevant group; a set number of groups; a set number of locations in each group.

A base level of detail for the digital map may be defined based on a minimum bounding box containing the locations of the most relevant group of locations. Each group of locations of decreasing relevance may be associated with increasing levels of detail compared to the base level of detail. The map may be displayed initially at the base level of detail, and locations belonging to groups associated with higher levels of detail than the base level of detail may be indicated with GUI elements having progressively lower prominence levels for progressively less relevant groups.

When the digital map is displayed at a given level of detail, locations belonging to groups associated with higher levels of detail than the displayed level of detail may be indicated with GUI elements having progressively lower prominence levels for progressively less relevant groups. Locations belonging to groups associated with levels of detail lower than the displayed level of detail may be indicated with the GUI element having the highest prominence level.

When, in response to user input, the digital map is zoomed from a start level of detail to an end level of detail associated with the next more relevant group, the GUI elements used to indicate the locations of each group may be increased to the next available prominence level. When, in response to user input, the digital map is zoomed from a start level of detail to an end level of detail associated with the next less relevant group, the GUI elements used to indicate the locations of each group may be decreased to the next available prominence level.

The locations may be representative of: destinations including one or more of addresses and points of interest; traffic events including one or more of accidents, delays, road closures, road works, restrictions, traffic volumes and closed lanes; and/or weather events including one or more of flooding, snow, ice, fog, adverse road conditions.

The portable electronic device may further comprise a search engine, the data repository may further contain records representing documents pertaining to destinations, the user query may be a search query for destinations for the search engine, and the data representative of the plurality locations relevant to the digital map may be produced by said search engine searching over those records for documents relevant to the search query. The search results may be ranked by relevance to the search query, the ranking being usable in the dividing of the locations into groups to be associated with increasing levels of detail for decreasing relevance. The plurality of locations may remain unchanged in response to panning or zooming the digital map. The number of locations returned by the search engine and displayed on the digital map may be limited to a maximum number.

The portable electronic device may further comprise a traffic event engine operable to return locations representative of current traffic events relevant to a user or device generated query, wherein the user query is a traffic event query. The traffic event query is for traffic events proximate to a search centre, a current location of the device or a route, or in a user-specified area of the digital map.

Viewed from another aspect, there is provided a method of operating a portable electronic device comprising data processing means, data repository containing data representative of a digital map, and display means, the method comprising, in relation to data representative of a plurality locations relevant to the digital map: providing, on a representation of the digital map displayed on the display, for each of the locations, one of a plurality of different graphical user interface (GUI) elements characterised by different prominence levels to indicate the locations, wherein the prominence level of the GUI element used for each location is dependent on the level of detail at which the digital map is displayed and a deemed relevance of that location to a user query.

The above-described method may optionally be adapted or include further steps so as to operate the portable electronic device in accordance with the above-described aspects.

Viewed from another aspect, there is provided a computer software product comprising instructions which when executed by data processing means of a portable electronic device cause the electronic device to be configured to carry out the above-described methods. The computer software product may be embodied as a computer readable medium, optionally a non-transient computer readable medium.

While the above aspects and options of the disclosure are described separately, is it to be understood that their provision in all possible combinations and perturbations is contained within the scope of the disclosure, without limitation. In this respect, the present disclosure provides methods, electronic devices and computer software that implement the above-described aspects of the disclosure in all possible combinations. For example, an electronic device is disclosed that is configured by software to provide the results of a free text search performed as described herein, in which search suggestions generated as described herein have been used to facilitate the search, and to display those search results in a map view in which GUI elements of different prominence levels are provided as described herein to indicate the locations of the search results.

BRIEF DESCRIPTION OF THE DRAWINGS

Some preferred embodiments of the invention will now be described by way of example only, and with reference to FIGS. 1 to 13 of which.

DETAILED DESCRIPTION OF PREFERRED EMBODIMENTS

The description with respect to FIGS. 1 to 4 provides background information to facilitate understanding of the invention in its various embodiments. The embodiments of the invention are described by reference to FIGS. 6 to 13.

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present document, a navigation device is intended to include (without limitation) any type of route planning and navigation device, irrespective of whether that device is embodied as a PND, a navigation device built into a vehicle, or indeed a computing resource (such as a portable personal computer (PC), mobile telephone, smart phone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location or information about a current or upcoming location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
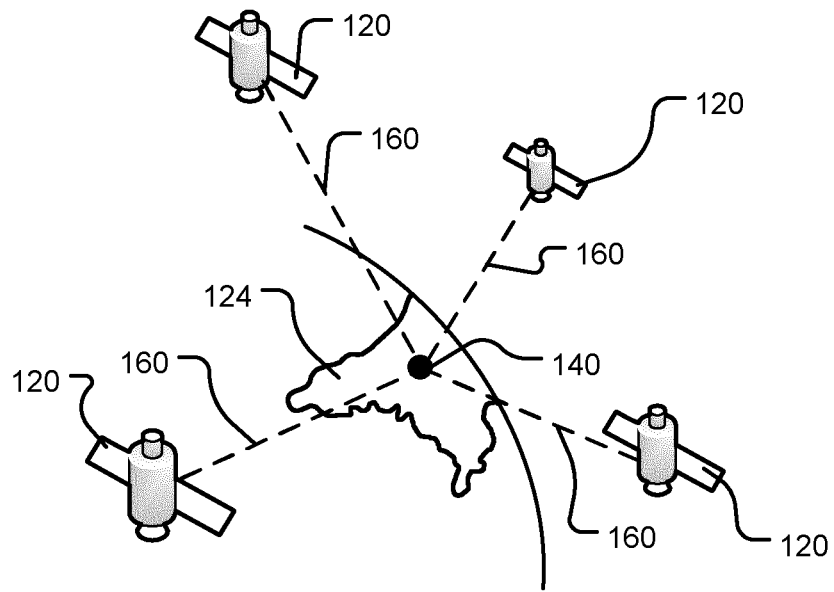
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
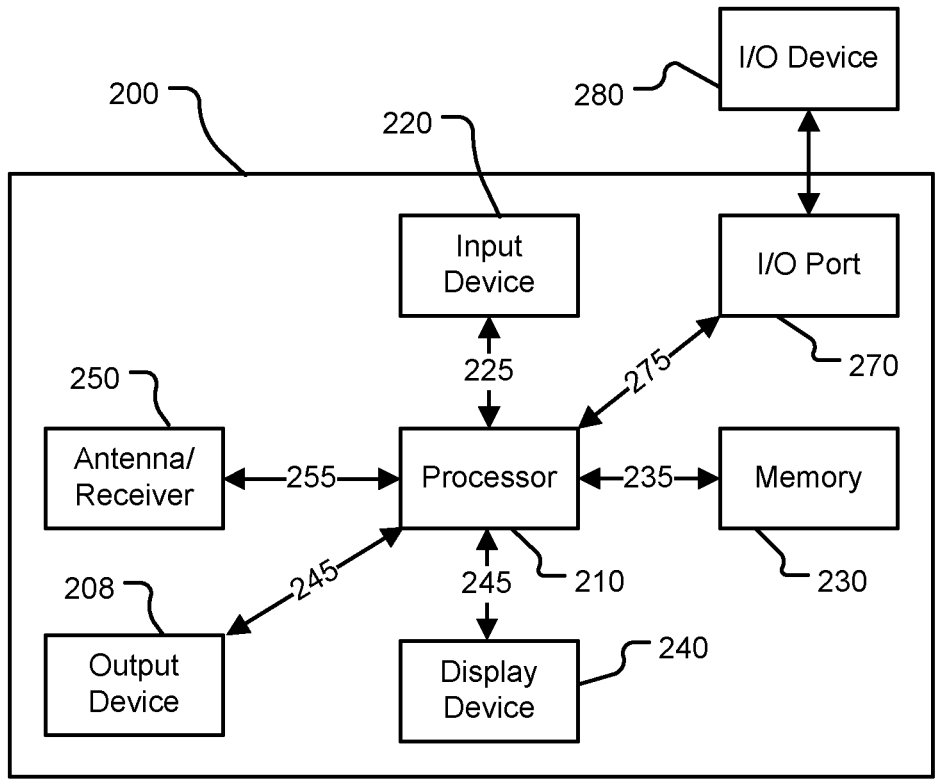
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of a display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present document. For example, the components shown in FIG. 2 may be in communication with one another via wired and/or wireless connections and the like. Thus, the scope of the navigation device 200 of the present document includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
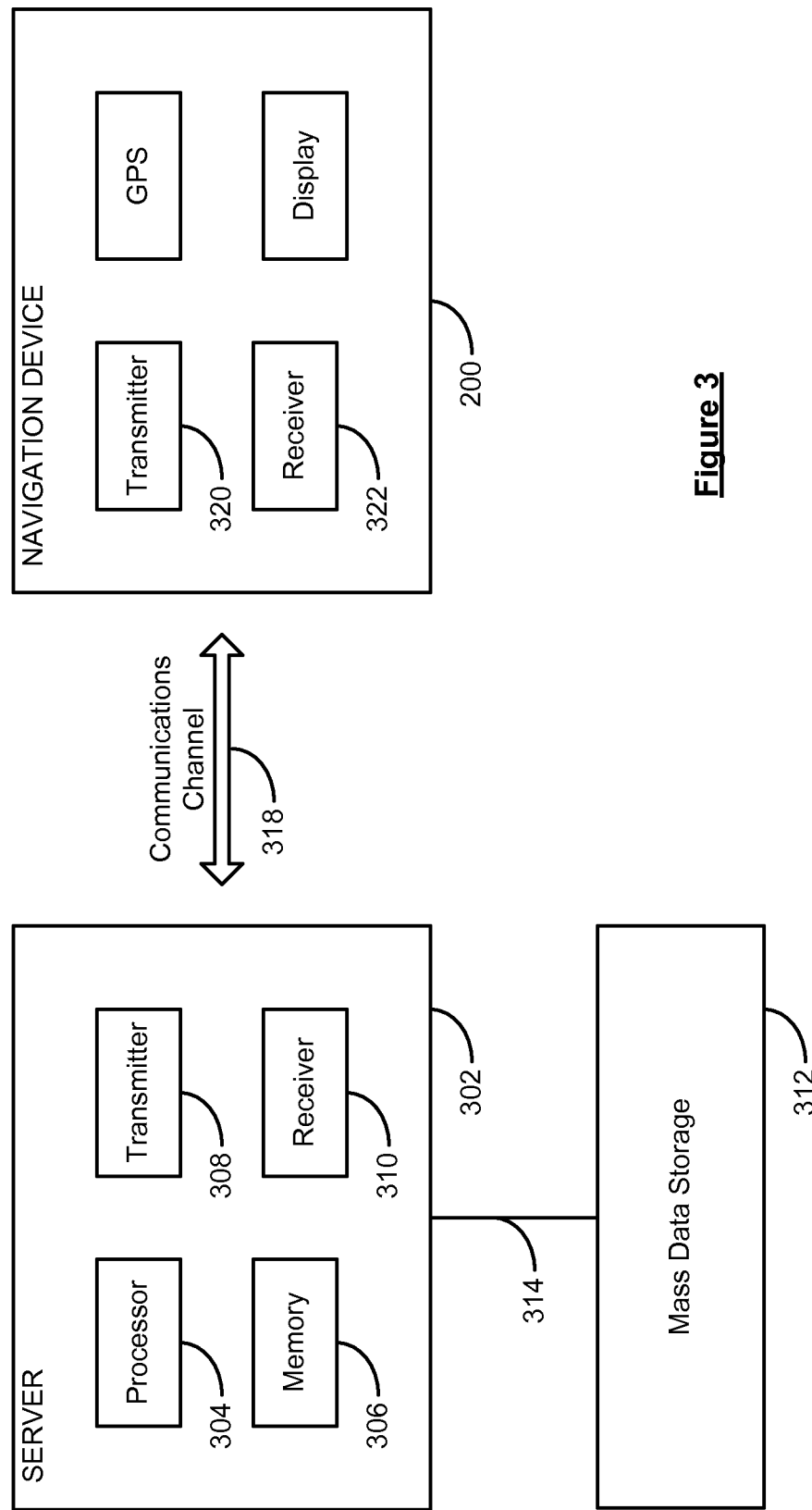
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
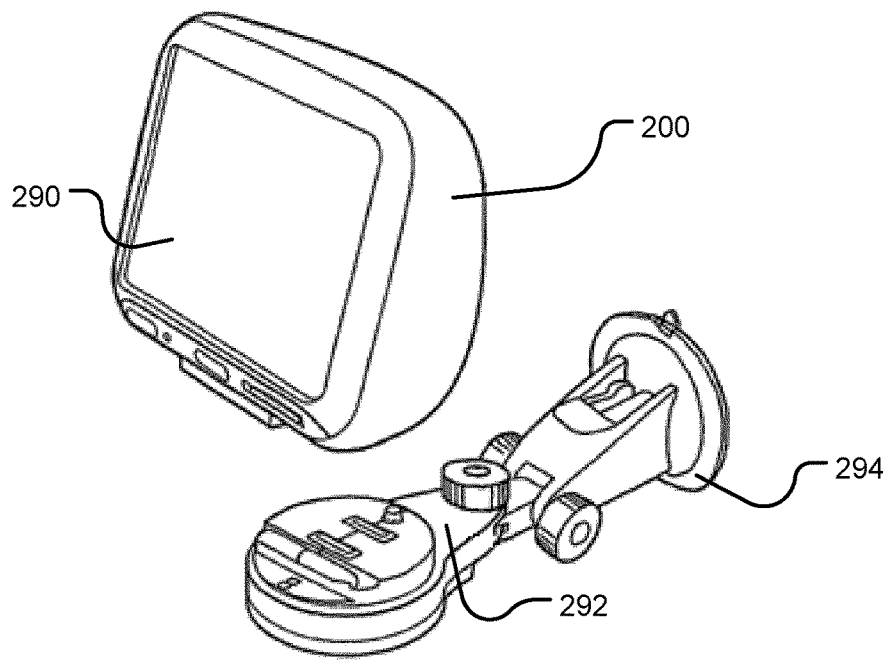
FIG. 4 are illustrative perspective views of a navigation device.
Figure 5:
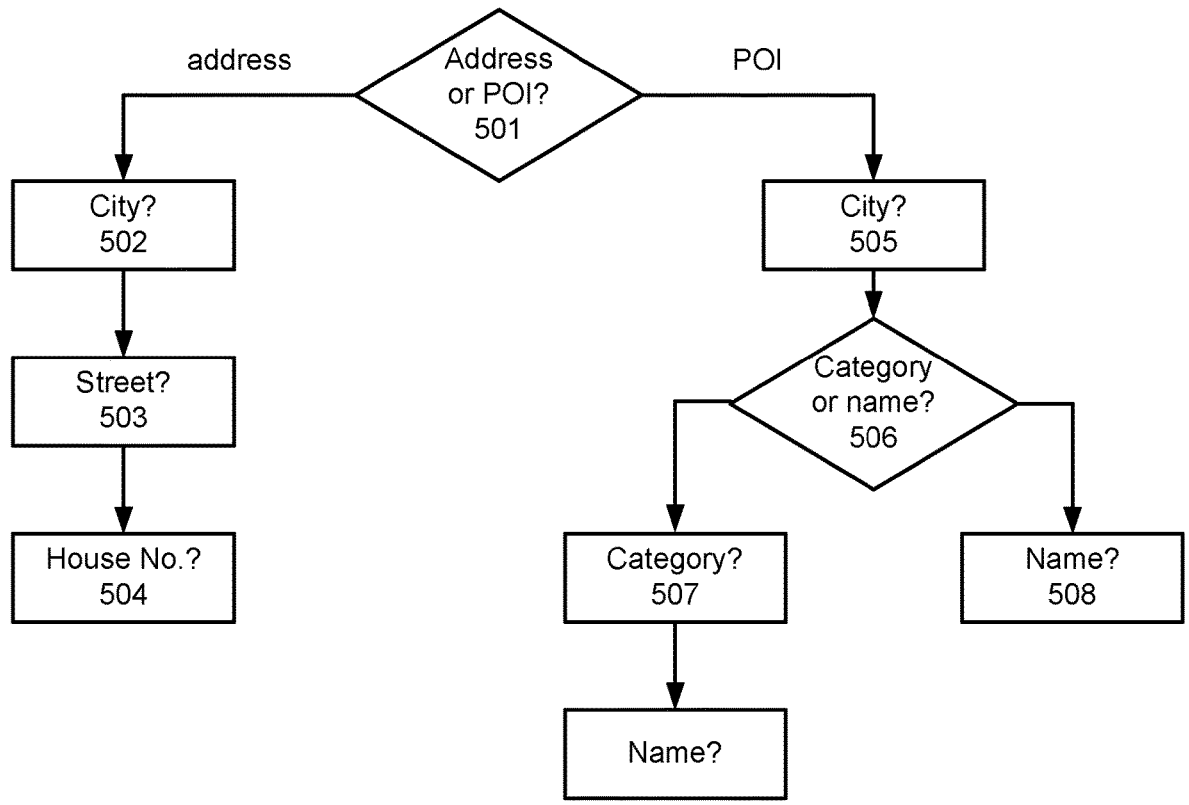
FIG. 5 is flow diagram illustrating the user prompts and data record queries performed in a prior art guided location search.

FIG. 4 is a perspective view of a navigation device 200. As shown in FIG. 4, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.). The navigation device 200 may sit on an arm 292, which itself may be secured to a vehicle dashboard, window, etc using a suction cup 294. This arm 292 is one example of a docking station to which the navigation device 200 can be docked. The navigation device 200 can be docked or otherwise connected to an arm 292 of the docking station by snap connecting the navigation device 292 to the arm 292 for example. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Navigation device 200 may have a digital map stored locally on memory resource 230, the digital map comprising data indicative of a plurality of navigable segments, the navigable segments being representative of a navigable network, e.g. a road network. The digital map may comprise a plurality of locations that can be selected as navigable destinations, e.g. to which a navigable route comprised of one or more segments can be generated. The locations can be stored in any suitable manner, e.g. as latitude and longitude coordinates and/or with reference to a segment or node of the digital map.

The locations within the digital map may represent addresses and thus have associated location information components including house number, street name, settlement name, country and postal code; that together define a specific address. The locations within the digital map may also represent previously stored manufacturer-supplied or user-generated points of interest (POIs), which may be "well known" destinations (such as famous locations, municipal locations (such as sports grounds or swimming baths) or other points of interest such as restaurants, bars, shops, etc. Such POI locations may have associated components including one or more of the POI name (e.g. "British Museum"), POI brand name (e.g. "Starbucks"), POI category name and/or category code (e.g. "restaurant" and "7315") and POI address (including house number, street name, settlement name, postal code and country).

Location data records (or documents) for one or more, and preferably all, navigable destinations within the digital map are stored locally on memory resource 230 (in addition to the digital map data). Each data record has an associated record identifier, which allows each record to be uniquely identified. The record identifier may comprise a first portion and a second portion: the first portion being a location reference, which may be in the form of a Morton code, and which identifies a geographic region of the digital map that contains the location; and the second portion being a pointer or reference to the information associated with the navigable destination, e.g. street name, country, POI name, POI category, etc, that is located in the digital map. It will be appreciated, however, that instead of a pointer to the location information associated with the navigable destination, one or more of the location data records may contain the actual location information, e.g. street name, country, POI name, POI category, etc, for the navigable destination.

Data records may also be stored for favourite or recently visited destinations. Data records representing different types of location may be stored in separate databases in the repository. For example, addresses, POIs, recent locations and favourite locations may be stored in separate databases.

At least some of the location data records stored in memory resource 230 may have been provided by the manufacturer of the navigation device 200 initially, before first use either by download to the device at or near its point of use after sale of the device 200 to the user, or by download to the device 200 before sale of the device 200 to the user. At least some of the location data records stored in memory resource 230 may have been provided by the manufacturer by periodic updates after first use by, for example, network download. At least some of the location data records stored in memory resource 230 may have been provided by the user either by manual specification or input, or by download to the device 200 by the user.

Free Text Search Engine

Embodiments of aspects of the invention provide an electronic device such as navigation device 200, and a method and computer software product for operating a navigation device 200 for searching the data repository of locations stored in memory resource 230 based on a user-input free text search string to thereby facilitate determination of a desired destination of the user from a single input string. Advantageously embodiments avoid presenting the user with a plurality of prompts for information that are required in order to perform a known guided search technique. The free text search according to embodiments is based on searching one or more predetermined indexes and, although the searched index may change, the one or more indexes themselves are not changed. Embodiments therefore also avoid the problem of further processing being required to modify the search space, as experienced when a trie implementation is used for a free text search.

Stored in local memory 230 of the device 200 is data representative of an index associating words contained in the data records with the records in which those words appear. The index may be generated locally at the device, or remotely at a server which is then downloaded to the device, or both. Where separate databases of data records are contained in the repository, separate indices may be generated for each database. Thus, separate indices may be generated based on geographic region (e.g. for particular countries, states, or the like) and/or type of location (e.g. address, POI, etc).

The index is a list of all words contained in all location data records stored in repository 230. For each word it has entries of data records containing that word. The records are stored in the index as tuples relating the word to the document IDs of documents containing that word. The documents are either addresses or POIs.

As discussed above, the data records may represent either an address or a Point of interest (POI), and may contain data representative of one or more of the following components: street name; place name; postal code; country code; POI name; POI brand name; POI address; POI category code.

Table 1 below shows a simplified example of data records representing addresses.

TABLE 1

| Document ID | Address |
| --- | --- |
| 1 | Kalverstraat, Amsterdam, NLD |
| 2 | Marco Polostraat, Amsterdam, NLD |
| 3 | Kalverstraat, Den Haag, NLD |

The index for the words contained in these documents (i.e. the components thereof), which forms the basis of the free text search engine, is shown in Table 2 below.

TABLE 2

| Word | Matching Document IDs |
| --- | --- |
| Amsterdam | 1, 2 |
| Den | 3 |
| Haag | 3 |
| Kalverstraat | 1, 3 |
| Marco | 2 |
| NLD | 1, 2, 3 |
| Polostraat | 2 |

As discussed above, in preferred embodiments, the document ID (i.e. record ID) of a data record includes a Morton code which itself provides a location reference relevant to the digital map, thereby being usable to locate the area/location to which the data record relates. A second portion of each data record contains a reference to the relevant data within the map. In this way the size of the files for the data records is minimised, which is important in view of the limited storage capacity in typical PNDs. The location reference associated with each document ID is used when performing searches around a so-called "search centre" (i.e. a location/route used in ranking the results for relevance to a search—to be explained further below).

The electronic device 200 also has stored in memory 230 a computer program product comprising instructions which when executed by the data processing means cause the electronic device to perform a free text search method 600, explained with reference to FIG. 6.

A search query is received 601, input by a user into a user interface of the device using, for example, a physical or virtual keypad, or voice commands. The search query includes a search string. The search string is processed 602 to provide one or more search words. The index is queried 603 to identify data records containing the or each search word. A rank is generated 604 for each of the one or more identified data records indicative of the relevance of each identified data record to the search query. The search results may be displayed 605 on the display in rank order.

Thus given a text string (input into the device 200 by the user via a physical or virtual keyboard, voice recognition or by other means) that may comprise one or more characters that may make up one or more words (words including a string of alphanumeric characters bounded by space characters and/or the start and/or end of the string), the free text search engine according to an embodiment can produce one or more of the following results: matching addresses; matching points of interest (POIs); POI category suggestions.

Figure 6:
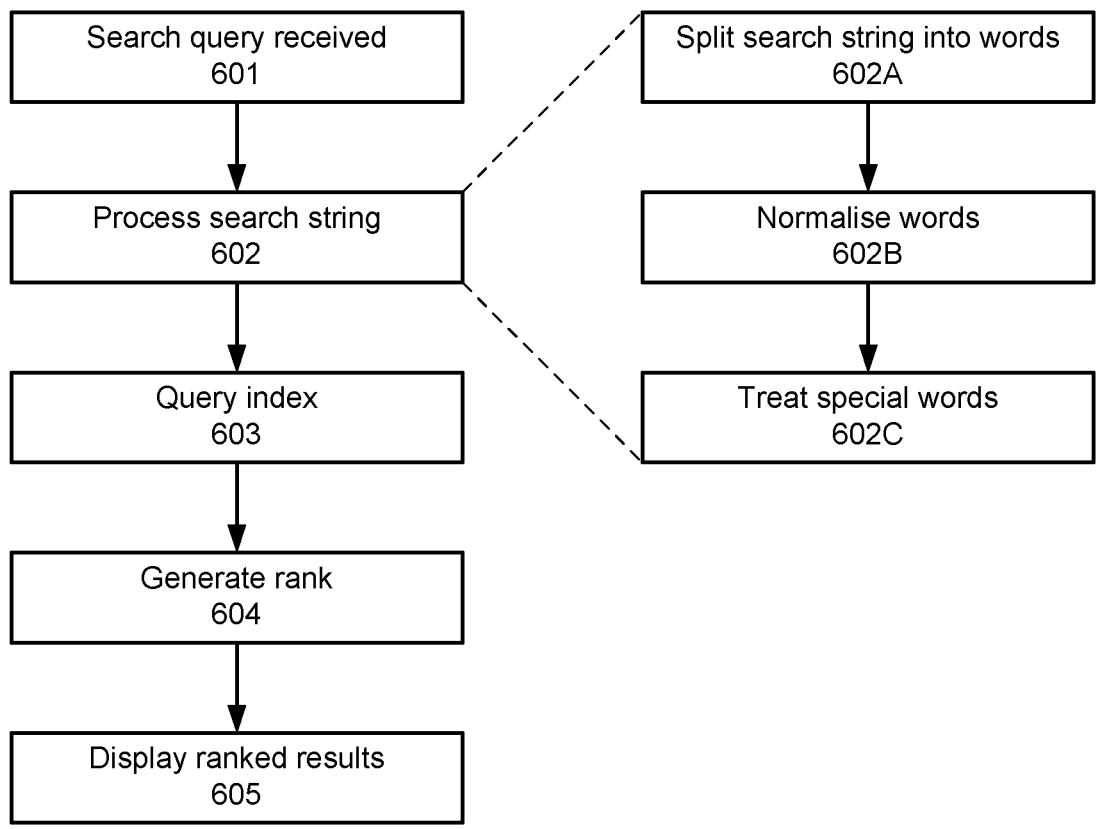
FIG. 6 is a flow diagram of a free text search method according to an embodiment.

The processing of the search string to provide one or more search words is shown further in FIG. 6. The computer program product further causes the electronic device, when processing the search string, to perform one or more of: splitting the search string into words 602A; normalising the words 602B; identifying and treating special words 602C.

To split the search string into words in 602A, all non-alphanumeric characters are considered to be word separating characters. Some examples:

1. "Kalverstraat, Amsterdam" is split into "Kalverstraat" and "Amsterdam"
2. "'s-Gravenhage the Netherlands" is split into "s", "Gravenhage", "the" and "Netherlands".

With the single words the index is queried.

To normalise the words in 602B, one or more processing steps intended to account for irregularities in the content of the search string may be performed. The purposes of normalization include: allowing for spelling errors; and support abbreviations, e.g. "st" for "street".

The lookup for words in the index demands that the word is exactly spelled as it is stored in the index. A minor misspelling causes the lookup fail. So if the user spelled "Kalverstrat" instead of "Kalverstraat" and normalisation were not used, then no matches would be found as the word "Kalverstrat" is not in the index.

To allow for such minor misspellings, the words themselves are not stored in the index. Instead a normalized form of the words is stored. To query the index with the words from the user input, the words are first normalized. The idea behind normalization is that different (mis)spellings have the same normalized form, and hence matching documents are found for these different (mis)spellings.

A further advantage of only storing normalised versions of the words is that the size of the index is smaller than if the input text version of the words had been stored. Advantageously, less data storage is required for the index and the processing requirements to perform a search are also reduced by the smaller index. The normalisation rules used to generate the index from the stored data records are preferably the same as those used to process the search string at the device when the free text search query is received. Normalisation may include one or more of:

converting all letters to lower case, e.g. "A" becomes "a";
removing accents from letters, e.g. "ü" becomes "u";
replacing a sequence of the same letter by a single letter, e.g. "nn" becomes "n" (note this only involves letters, not digits);
replacing single letters with other letters (see below);
The previous step might produce sequences of the same letter (again these sequences are replaced by a single letter);
replacing words and abbreviations with standard abbreviations, e.g. "street" becomes "st".

Described below is the process of replacing sequences by a single letter.

This is done with all sequences found from letter position 1 in a word (the first letter is at position 0). A sequence starting at the first letter is not replaced. The rationale is that changing letters in the beginning of a word will lead to non-logical matches.

The starting position at which sequences are replaced is stored in the index.

Described below is the process of removing accents.

The replacement non-accented character is the same base letter as the accented character. In addition, there are a few special cases which officially are not accented characters, but may be treated as such.

Described below is the process of replacing letters.

To allow for single letter misspellings, some letters are replaced by others. The rationale is that some letters have a similar pronunciation, and therefore people might easily type the wrong letter (note that the normalization technique disclosed herein is language independent). So letters that sound similar in one language may not in another language. For the normalization, that does not really matter as the goal is to map multiple spellings onto a single form. The ranking algorithm will favour correct spellings over misspellings.

The replacement rules are driven by data in the index. The replacement rules are shown in Table 3.

TABLE 3

| Rule ID | Start from | Letter | Replacement |
|---|---|---|---|
| 1 | 0 | œ | oe |
| 2 | 0 | æ | ae |
| 3 | 0 | ij | ij |
| 4 | 0 | β | s |
| 5 | 4 | e | a |
| 6 | 4 | i | a |
| 7 | 4 | o | a |
| 8 | 4 | u | a |
| 9 | 2 | q | k |
| 10 | 3 | c | k |
| 11 | 3 | w | v |
| 12 | 3 | m | n |
| 13 | 3 | z | s |
| 14 | 3 | d | t |
| 15 | 2 | h | |

The "start from" number is the letter position from which to start making replacements. The first letter of the word is at position 0. Letters before the "start from" position are not changed. The rationale is that changing letters in the beginning of a word will lead to non-logical matches.

Described below is a normalization example:

1. The word to be normalized is "Oosterdoks straat"

2. Lower casing gives "oosterdoks straat"

3. There are no accents to remove

4. Replacing sequences by single letters (starting from position 1) gives "oosterdokstrat"

5. Replacing single characters using the rules above gives "oostartakstrat".

Described below is the process of normalizing abbreviations.

Some words might be abbreviated. A word might be spelled abbreviated in the digital map or a word might be abbreviated in the user input. An abbreviation should have the same effect as a full word. So if the user types an abbreviation, it should match with the full word in the digital map, or if the user types a full word it should match with its abbreviation in the map. Examples of abbreviations:

TABLE 4

| Word | Abbreviation |
|---|---|
| city | cty |
| street | st |
| saint | st |
| south | s |

Multiple words may be abbreviated to a single abbreviation, for example "aan de" is abbreviated to "ad".

To make abbreviations match the full words, the full words are replaced with the abbreviations in the index. In the user input, the search engine replaces full words with the abbreviation before querying the index.

The process of replacing full words with an abbreviation is more complicated than this though, because same spelled words may have different abbreviations in different languages. For example, the word "avenue" gets abbreviated to "ave" in English. But it gets abbreviated to "av" in French.

To solve this problem, normalization is done to the shortest abbreviation.

To identify and treat special words in 602C, the input is analysed to find special words comprising one or more of: country codes/names; house numbers (only for address search); POI category names (only for POI search).

Then these special words are treated by one or more of: converting country names and codes to standard country codes; removing house numbers; identifying words that correspond to categories of points of interest (POI); and replacing with a POI category code.

If the full search string is a POI category name or a prefix of a single POI category name, the search query is generated for records in the POI category. If the full search string includes more than one word and starts with a POI category name, two search queries are generated produced as follows: a first query in which the POI category name is provided as a search word; a second query in which the POI category name is replaced by a POI category code.

Each of these special words needs special treatment as they are not part of the index. For example: instead of POI category names, the index contains the numerical POI category code; house numbers are not in the index; and for countries, the 3-letter ISO code is in the index, but the 2-letter code and the full names should work as well.

Described below is the process of country code/name detection.

The search engine can recognize country codes and names at the end of the user input only. The limitation to detect country codes and names at the end of the user input only is made to limit the number of ambiguities. What looks like a country code or name, may not be a country code or name:

1. The name of a street might be the same as the name of a country

2. A word might be the same as a country code, e.g. "De Pol" is the name of a village in the Netherlands, but POL is also the 3-letter country code for Poland. "USA Today" could be the name of a POI, but "USA" is also a country code.

If the end of the user input could be a country name/code, then the search engine performs two queries: once with the user input as is; and once with the user input where the country name/code is replaced by the ISO 3-letter code. For example:

1. The user enters "vapiano, germany"

2. The search engine executes the following queries "vapiano germany" and "vapiano deu"

In the above examples normalization of the user input was not described for the sake of clarity. The search engine would also be configured to normalize the user input prior to searching.

Described below is the process performed for recognized names/codes.

The search engine recognizes the following names and codes: 3-letter ISO codes (e.g. NLD, DEU, FRA); 2-letter codes (e.g. NL, DE, FR); and full names in any UI language (e.g. "The Netherlands", "Nederland", "Pays-Bas").

Country names are recognized in all country names, no matter what the UI language is. A user might copy an address from some source (e.g. a business card) that shows the country name in another language than the UI language.

Described below is the process performed for house numbers.

House numbers are not stored in the index for addresses. A street can have many house numbers. Storing all individual house numbers in the index would greatly increase the size of the index and the required processing capability to search the index. So the search engine first removes a house number from the user input, before querying the index. Then when streets are found, the house numbers for those streets are resolved.

Preferably if a POI has a full address that is searchable, a house number in this full address is stored in the index.

There can be ambiguities and what looks like a house number might not be a house number. For example a street name might contain a number, e.g. "42nd street".

To detect house numbers, the search engine does the following:
1. Assume there is no house number in the user input and query the index with the full user input.
2. If no matches are found, then check if the user input contains a word that has a numeric part. If so, then drop this word from the input and query the index again.
3. If a match is found, resolve the house number from the user input.

If the user input contains multiple words with numbers, then these can all be potential house number candidates. These are all tried one after another, e.g. first drop the first candidate, then drop the second candidate (without the first candidate dropped), and so on.

Described below is the process for resolving a house number:
1. Check if the house number exists on the matched street. If not, then suggest a nearby house number (nearby in the numerical sense)
2. Get a coordinate (lat/lon) for the house number.

Described below is the process for POI category names.

The search engine recognizes POI category names only at the beginning of the user input. This limitation is made to minimize complexity and ambiguities. A (part) of a POI category name may not be a POI category name.

The search engine recognizes the primary name of a POI category and synonyms for these primary names. The primary names and the synonyms are stored in the map. When a match on a synonym is found then the suggestion will contain both the primary name of the POI category and the synonym.

A "synonym" can be any name that is associated with the POI category name, e.g. "cafe" is put in the map as a synonym for "restaurant". When the user types one of these associated names, the search engine will give a suggestion to search for the associated POI category which is not exactly what the user asked for, but better than nothing at all.

If a POI category name is found then the search engine might do several things including: generate suggestions; perform a POI window query; and perform an FTS query with a POI category code.

Now that the received search string has been processed and a group of one or more search words is generated, the index is queried 603 to identify data records containing the or each search word. For each search word, the set of matching records from the index is found. Then, the intersection of the sets of records is determined to provide the records that match all words.

Returning to the simplified example shown in Table 1 above, and the index for the words shown in Table 2 (note that for simplicity, this example index has not undergone normalisation), to find matches for the user input "Kalverstraat, Amsterdam", the input is split into the words "Kalverstraat" and "Amsterdam".
1. "Kalverstraat" matches with documents 1 and 3
2. "Amsterdam" matches with documents 1 and 2
3. The intersection of these matches is document 1, i.e. the address "Kalverstraat, Amsterdam, NLD".

Thus the query of the index returns document 1. Clearly this is the correct result.

As indicated above, there is a special case where a search string contains a POI category name.

Described below is the process performed when the full user input is a POI category name.

If the full user input is a POI category name or the prefix of a single POI category name, then a search for POIs in the POI category is done. Examples of user input to which this applies are: restaurant; and railway (the full category name is "railway station", but there are no other category names that start with "railway").

If a search centre (i.e. a location/route used in ranking the results for relevance to a search—to be explained further below) is defined, then a POI category window query around the search centre is done.

If no search centre is defined, then a query with the numerical category code is performed (the index contains the numerical category code for a POI).

Described below is a process for a POI category suggestion.

In addition to querying the index, POI category suggestions are created for all matching POI category names/synonyms.

Described below is the process performed when the user input starts with a POI category name.

If the user input starts with a POI category name then two queries are done:
1. A query with the user input as is.
2. A query where the POI category name has been replaced by its numerical category code.

Described below is the process for performing a POI category suggestion with address indication.

In addition to querying the index, a POI category suggestion is created. The user input text that comes after the category name is used as an input to the address search engine. If that text gives one or more matching address results, then these address results become the addresses for the POI category suggestion. For example:
1. The input is "restaurant paris"
2. The string "paris" is used as an input to the address search engine.
3. The first result is the city centre "Paris, FRA".
4. This result becomes the first address in the address list for the "restaurant" suggestion.

If the string after the category name does not give any matching address results, then no suggestion is created. For example, the input "restaurant vapiano" does not give any POI category suggestions with an address indication.

After the index has been queried with the processed search string and a set of matching data records has been identified, those results are ranked 604 for relevance. When generating a rank for each data record, the device 200:
- calculates a score for each record;
- ranks the records based on their scores;
- if two records have the same score, their rank ordering is reconciled based on a distance from a search centre if available, otherwise the rank order of the two records is random.

To calculate a ranking score for each record, the device 200 starts from a starting score (in this embodiment, 1000) and performs one or more of:
- subtracting a penalty from the score for each word contained in the search string not exactly matched to a word contained in the data record;
- subtracting a penalty from the score for a structural difference between the search words arranged in the search string and how the words appear in the data record, including incorrect word order and word gaps;
- subtracting a penalty from the score for each unmatched word contained in a component for which there is a word matching a search word;
- adding a bonus to the score for data records indicated as important matches;
- adding a bonus/penalty to the score based on a distance from the current position of the device so as to raise more local results to higher levels in the rankings (a majority of journeys are within 75 km).

It is important here to note that, while the separated words of the search string are normalised for querying to find matching records using the index, when the matching records are ranked, it is the raw, un-normalised separated words of the search string that are compared with the raw components of each data record.

Described below is the process for determining word penalties.

For each word in the user input, a matching word in the matched document is found. If the words are identical, then it is a perfect match and the word gets no penalty.

If the words are not identical the penalties are given. The penalties for all words are summed together. This is the total word penalty.

Described below is the process for determining structural penalties.

After the total word penalty is calculated a penalty is added for structural mismatches. As mentioned above, addresses and POIs consists of several components that include, for example: street name; place name; postal code; country code; POI name; POI brand name; POI address.

Some of these components may have multiple names, e.g. a city may have names in multiple languages. The structural analysis looks to which components the words of the input match, to which names they match and in which order. Illogical matches get penalties. Very illogical matches may get a maximum penalty and will be filtered out completely.

For each word in the user input starting from the second, a comparison is done with previous words. For each penalty a short explanation is given below:

Jumping back and forth between components

For example if the first input word matches with a word in the name of a street, the second input word with a word in the name of the city for that street and the third word matches again with a word in the name of the street, then the matches jump back and forth between the components. Such a match is completely discarded.

Switch to another component

If a word matches to a word in the place name, while the previous word matched to a word in the street name, then that is a switch to a new component. This is not wrong, but it is given a penalty of to favour matches that have a longer sequence of consecutive words within a single component.

Name switch within a component

If a component has multiple names, then words from the input may match these multiple names. A match with multiple names seems not logical and hence it gets a big penalty. An exception to this rule is area names.

Word order mismatch in street and place names

The order of words in street names and place names is well known, hence a wrong order match is completely filtered.

Word order mismatch in other components

Word order in other components, e.g. POIs, might not be well defined. This is given a penalty for the mismatch.

Match gaps

Two subsequent words match with the same component, but there are words in-between them that are not matched. The structural penalty for each word is added to the total word penalty.

Described below is the process for an unmatched word penalty.

If there is a word match in a component, then a penalty can be given if not all words for that component are given. This penalty is not given for all component matches.

A bonus may be applied that is specific to addresses and POIs.

Described below is the process for multiple ways to match words.

All penalty calculations involve comparing a word from the user input, with a word from a document. Both the user input and a document can contain a word multiple times. Hence there are different ways to match words from the user input with words from the document. The ranking algorithm tries all possible matches and the one that produces the highest score is the score for the match.

Where the matching record represents an address, calculating a ranking score for a record representing an address includes the following steps:
- not ranking the data record if there is no search word matched against a word in the index contained in the street name of the data record;
- if the user input contains a house number, then it must be either in front or behind the street name otherwise the matching data record is not ranked;
- if there is a search centre, adjusting one or more of the penalties to: suppress penalties for data records relatively near to the search centre, or increase penalties for data records relatively distant to the search centre, or both. This is to give higher priority to matches close by. For example, if a user searches for "centraal station" and is near a street called "centraal station Amsterdam" (central station Amsterdam), it is highly unlikely that the user is searching for an exact match in England where there is a street called "central station". It therefore is better to show the closer search result first;
- add a bonus to the score if there is a word match with a centre of settlement, dependent on the size of the centre of settlement and a distance of the centre of settlement from a search centre, if available.

Where the matching record represents a point of interest (POI), calculating a ranking score for a record representing an address includes the following steps:

- not ranking the data record if there is no search word matched against a word in the index contained in the one of the components of the data record representing the name of the POI, the brand name of the POI or the POI category;
- if there is a search centre, not subtracting a penalty from the score for each unmatched word contained in a component for which there is a word matching a search word. This way the distance gives an important weight to the ranking;
- if there is no search centre, subtracting a penalty from the score for each unmatched word contained in a component of the data record representing the name of the POI or the brand name of the POI for which there is a word matching a search word. These penalties are not added together, but the minimum from both is taken as the total unmatched word penalty;
- if there is no search centre, subtracting a penalty from the score if there is no search word matched against a word in the index contained in the name of the POI or the brand name of the POI. This is to make sure that other matches that have a good match on name or brand name will be ranked higher.

Described above are processes that a navigation device 200 is configured to perform in order to determine destination information from a user input. The free text search avoids the plurality of prompts that are required for a guided search. In addition, the use of the index avoids the additional computational demands that are required by a trie based free text search.

Where a plurality of indexes are provided, each database containing information in relation to particular types of navigable destinations, e.g. addresses and POIs, it will be appreciated that each index has to be queried separately. In some embodiments, both indexes (and thus associated data records) can be searched in parallel. However, due to the processing restrictions typically found on mobile devices, the indexes will often need to be searched in sequence. In some embodiments, the "address" index is searched first by default, and then the "POI" index; meaning that the address results will appear first on the device, before the POI results. This can be reversed in certain situations, however, if heuristics indicate the user is probably searching for a POI rather than an address.

In order to further speed up the search, and as briefly mentioned above, a plurality of indexes can be created for particular geographic regions within the entire geographic area represented by the associated digital map. For example, if the digital map represents Europe, an index may be created for each country within Europe. Similarly, if the digital map represents the United States of America, an index may be created for each state within the U.S.A. This can be speed up the search because, for example, certain indexes can be excluded from the search if they do not contain the particular combination of letters being searched for. For example, if the user types in "oo" into a search input string, only a subset of the databases may be found to contain entries starting with this combination. These databases can be flagged, and then, when a third letter is typed, only the subset of databases needs to be searched. A further file associated with each index may be stored identifying particular combinations of letters that are either in or not in the database. This side file can then be searched first to include or exclude particular indexes from the subsequent search.

Free Text Search User Interface Including Search Suggestions

Embodiments of aspects of the invention provide an electronic device such as navigation device 200, and a method and computer software product for operating a navigation device 200, for facilitating a user in searching a data repository of locations by generating and displaying selectable search suggestions based on a user input free text search string. The searching performed may be using a free text search engine of other aspects of the invention, such as the exemplary embodiments outlined above.

By providing selectable search suggestions in response to user input during a generation of a search query, a fast and accurate search is performed that allows a user to easily find a location, place or address using a single line search user interface. The user experience is improved since suggestions and search results are shown as the user input is entered.

Figure 7:
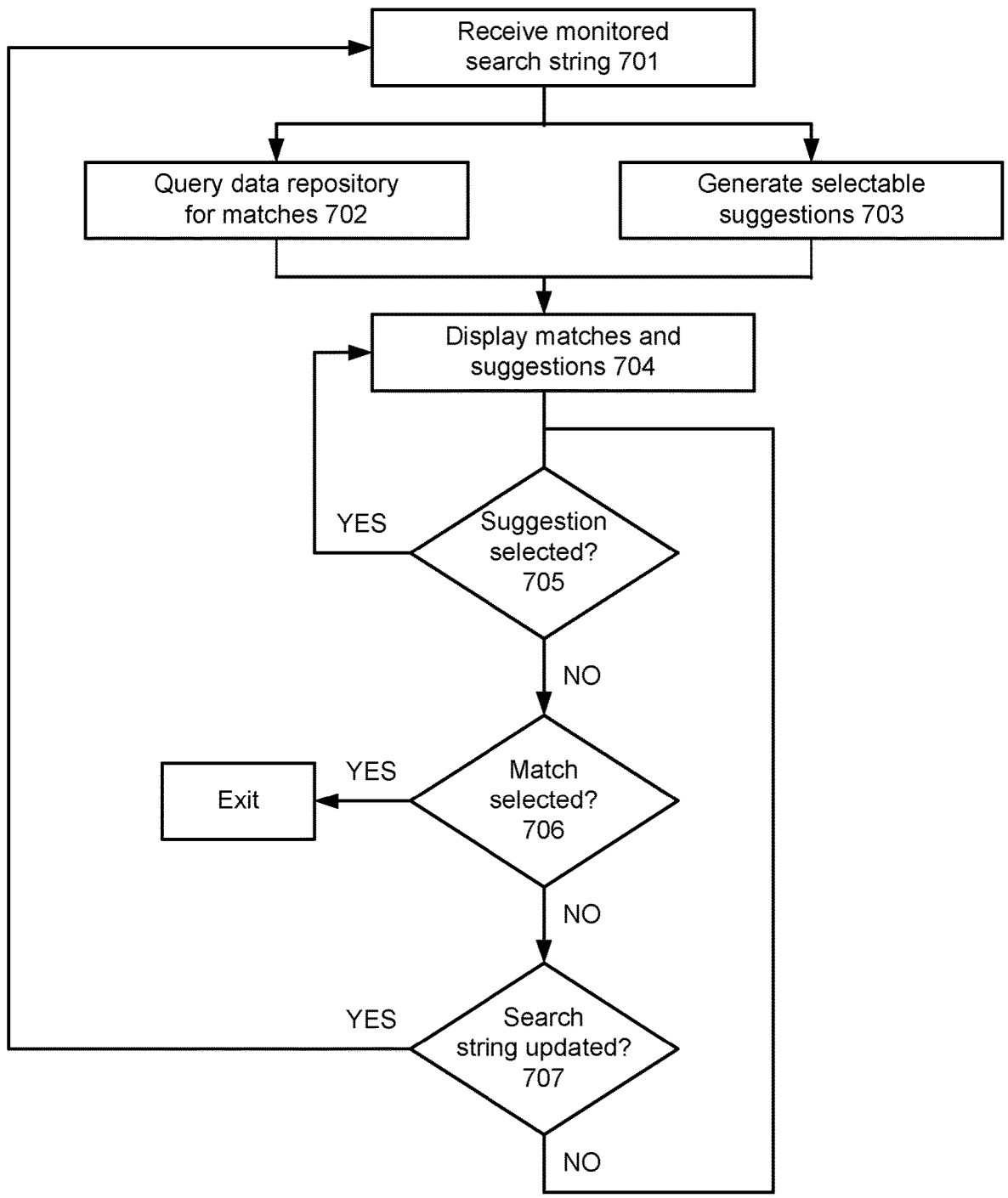
FIG. 7 is a flow diagram of a method of generating and displaying selectable search suggestions based on a user input free text search string according to an embodiment.

Referring now to FIG. 7, memory 230 of device 200 contains a computer program product including instructions for facilitating a user in searching the data records and in which the following steps are performed. A free text search string is monitored 701 as it is input by a user of the device. Then, based on the search string as it is input: the data repository is queried 702 for matching records; and suggestions selectable by a user to adjust the search are generated 703. The querying of the data repository performed in step 702 may be by using the free text search engine described above in relation to FIG. 6. At least some of any matching records and suggestions are displayed 704 on the display 240. In response to receipt of user input indicating a selection 705 of a matching suggestion, the search is adjusted according to said suggestion and the search query 702 is run again. In response to receipt of user input indicating a selection 706 of a matching record, the process exits, otherwise, in response to receipt of user input in relation to the free text search string 707, the process loops back to the start.

To enable user operation of the device 200 to implement the above search functionality, the memory 230 comprises instructions to provide to the user a user interface. An overview of an example user interface 800 displayed during a search operation according to an embodiment is shown in FIG. 8.

Figure 8:
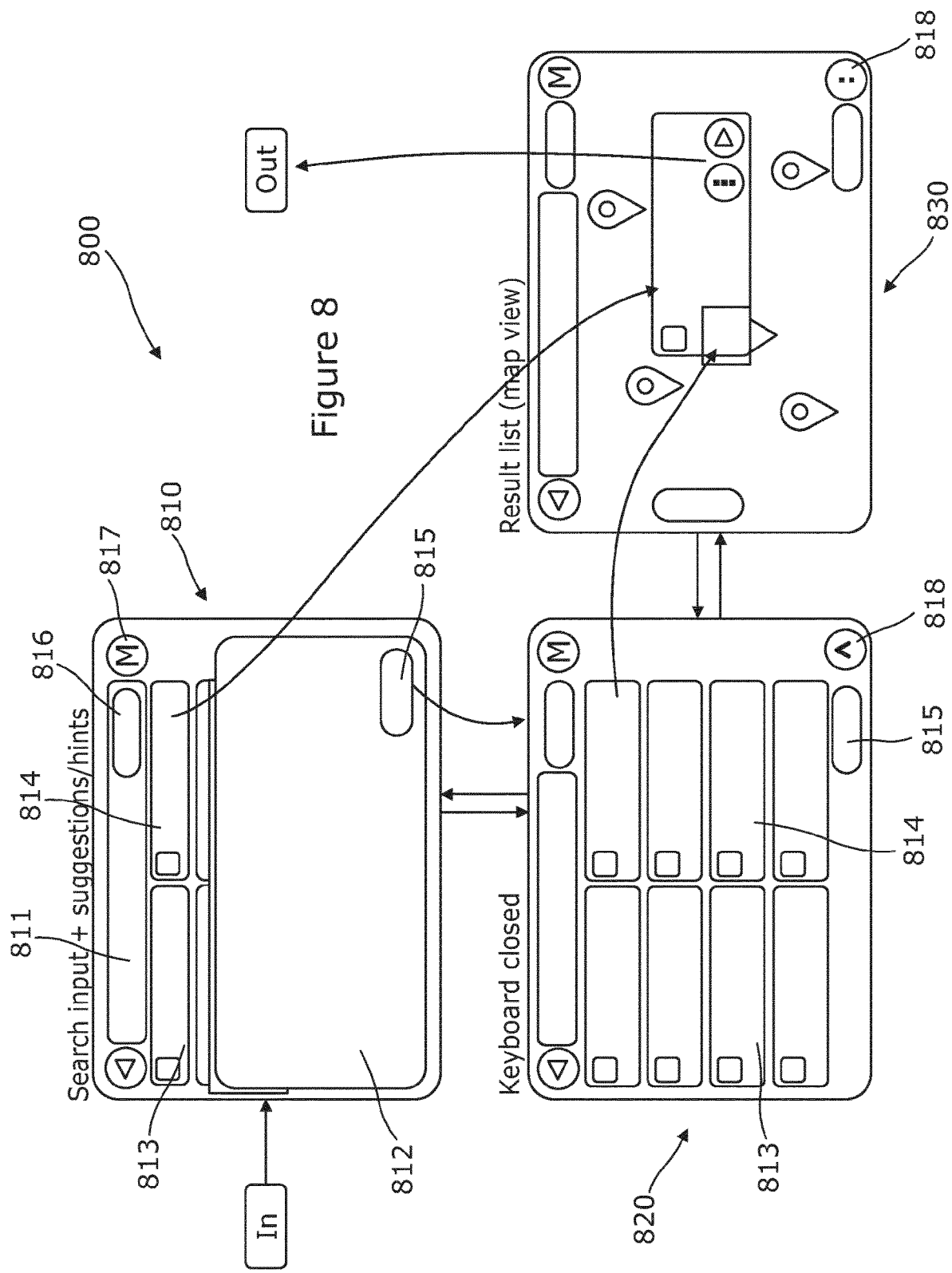
FIG. 8 is an overview of an example user interface 800 displayed during a search operation according to an embodiment.

With reference to FIG. 8, the user interface comprises a first view 810 for receiving user input for searching, a second view 820 corresponding to said first view in which the search results are displayed in full list view, and a third view 830 in which the search results are displayed in relation to a digital map (a more detailed description of the map view 830 is set out later in the present document).

The user input view 810 includes one or more of:
- Input box 811 for receiving a user-input free text search string, which when selected displays a caret, or text input cursor;
- Virtual keyboard 812 (individual keys not shown, for simplicity) that appears when input box 801 is selected or active such that text input using the virtual keyboard 812 is displayed to the left of the caret. The device 200 includes a touch sensitive screen overlay which the user can use to interact with the virtual keyboard 812 in order to type characters into the input box to generate the search string;
- A first column 813 for displaying selectable GUI elements representing ranked data records representing addresses matching the current search query and search suggestions relating to addresses based on the current search query;

A second column 814 for displaying selectable GUI elements representing ranked data records representing POIs matching the current search query and search suggestions relating to POIs based on the current search query;

A selectable button 815 that causes the virtual keyboard 812 to be closed/opened such that the view is toggled to list view 820 in which the search results and search suggestions are shown in full as a scrollable list;

A selectable GUI element 816 to the right of the user input box 811 showing an indication of a current search centre;

Selectable GUI element 817 for sending a query over a wireless connection to obtain results found by a search performed by another device. This option would only be available if the navigation device 200 was suitably enabled for wireless operation and a wireless connection was available. Results received via the wireless connection are shown as a new list view (i.e. results are not merged with the on board results) and are shown as they come in. Tapping back button will show the static results (from on-board the device) again.

The first 813 and second 814 columns are scrollable together or separately by, for example, the user performing a swipe or a drag gesture on the display such that the matching data records and search suggestions can be perused.

The list view 820 includes many of the GUI elements from the input view 810, and additionally a selectable GUI element 818 for toggling between the list view 820 and map view 830. Toggling to map view causes the locations of the address and POI search results displayed in first 813 and second 814 columns to be indicated on a digital map displayed on the display. As will be explained in more detail below, one of a plurality of GUI elements having differing prominence levels is used to indicate the locations of the search results. One or more of the GUI elements is selectable to provide the user with more information about the results.

When the user interface 800 is first displayed in either input view 810 or list view 820, such that no search string is input into the input box 811, GUI elements representing data records corresponding to default addresses and POIs (such as recent address destinations, distance ordered favourites and recent POIs) are shown in columns 813 and 814. The monitored, 'real-time' searching of the on-board location data records stored in memory 230 may not commence until more than three characters have been input into input box 811. When only one or two characters have been input, the searching may be in relation to the default addresses and POIs only in a similar manner to the searching described above.

Selection (for example, by a user input touch on the touch screen) of a GUI element shown in column 813 or 814 representing a data record corresponding to an address or a POI causes the view to be changed to map view 830 with the locations of the listed search results indicated on a digital map. The display is centred on the selected data record with the map displayed at a level of detail corresponding to a level of detail associated with the ranked search result.

As described above, to help guide the user towards a navigable result, the navigation device 200 provides in columns 813 and 814 a mix of selectable results and suggestions while the user entering text. As the user input search string is monitored, and the search results and suggestions are generated in a continuous cycling process, the results and suggestions will be updated and re-presented after every character input in input box 811. Thus the data repository is queried for matching data records and suggestions are generated in response to each keystroke or other user input to adapt the search string or search centre, and each selection of a suggestion, and the display is thereafter updated to display any matching data records and generated suggestions. The results and generated suggestions may be:

1. Address matches (these are partial and full matches in the on-device map index and recent destinations).
2. Aggregated street matches (these are more a typing aid for street names that are very common, replacing the partially typed text with the full street name, e.g. High Street, Station Road, Main Street, Church Street, etc).
3. POI matches (these are partial and full matches in the on-device map POI index, favourites and any custom POI set).
4. POI Category matches (these are real suggestions that allow narrowing down the search).
5. POI category synonym matches (these allow the user to use category words that fit their mental model).

The key difference between the suggestions and the results are that only the results from the location index matches are navigable.

Address suggestions are derived from address matches that come back from the real-time input search. An address suggestion is a combination of street and/or city name.

When there are more than three matches with the same street name, the street name is shown above the set of identical street names. Tapping that suggestion replaces the partial match with the full street name (typing aid) and a space. (The next character(s) entered should then reduce the list of identical street name matches to cities that match those characters).

When the search string matches a city centre name, the city centre is shown as a suggestion.

Tapping that suggestion, changes the search centre to (in) [selected city centre].

Tapping an address match changes the search centre to the city centre from the matching address, replaces any search string with the street name from the matching address and places a space+the caret behind the street name. (This is locale dependent, e.g. a US address match for instance will put a space before the street name and places the caret at the first position in the input box. For example, "Oosterdokskade| (in) Amsterdam" or "|Madison avenue (in) New York").

When text is replaced by suggestions, the capitalisation and any special characters present in the index will be used.

If an address is not in the current country, show the country flag in front of the address if there is enough real-estate. The current country being determined from the received GPS data.

Thus address suggestions may be generated based on the street and/or settlement names of data records representing addresses matched with the search string. Selection of an address suggestion containing a settlement name may adjust the search centre indicated in GUI element 816 to correspond to that settlement such that the search results are ranked according to that search centre. Selection of an address suggestion containing a street name may replace the search string with the street name. After selection of an address suggestion containing a street name and settlement name, the user may be prompted to input a house number into the free text search string.

The generation of POI suggestions from POI results is further described below.

POI results consist of POI index matches and POI category matches. POI matches can be found by name, category and address matches. Where a search result returns a POI index or category match, a POI category suggestion is displayed in column 814.

As a user's mental model may not agree with the used naming convention for POI categories, a list of POI category synonyms of the main category names is added. When the system has a match for a synonym, the resulting POI suggestion shows the parent POI category name with the POI synonym recognised in the search string shown in brackets. This gives context to the suggestion as in some cases the category name differs quite a lot (e.g. gas station and petrol station are fairly similar, but café being a synonym for restaurant is less obvious). The POI synonym suggestion behaves the same as POI (parent) category suggestions.

Thus POI suggestions may be generated based on the names, categories and synonyms of categories of data records representing points of interest matched with the search string. Selection of a POI suggestion may filter the data records returned by the query to include only those having a POI name, category or synonymous POI category matching that of the POI suggestion. The application of a 'filter' for, for example, a specific value for a particular component of a data record, has the effect that the search only matches and returns results for ranking that have that specific value for that component.

Thus the generated suggestions can be used to facilitate the searching process. The suggestions help narrow the search query, allow for user error, and adjust the ranking. In this way, the user will be able to search the data records of locations more broadly, speculatively, and in a more targeted way, thus increasing the flexibility of use of the device 200.

Table 5 shows operations that may be performed when a result/suggestion is selected.

TABLE 5

| Result/Suggestion | Action when selecting item |
|---|---|
| Street | Current word is replaced by selected street name (current = caret is in or directly after a word) |
| Address (street + city) | Current input text is replaced by full street name. Search centre is set to city from address result. UI will switch to Address entry-only mode (button state for address entry, no poi results or suggestions |
| Full address (street + city + hsn) | Switch to map view with results shown. centre on marker corresponding with tapped suggestion and open context balloon. If house number (hsn) cannot be verified as a correct house number, then behaviour is the same as the address result above |
| City | Search input: Current input text is removed, search centre is set to city centre from city centre result. Provide city centre as first POI while no additional text has been entered. Change search centre: Replace input text by selected |
| POI category | Replace current (partial, synonym) word by (full, main) POI category name, and show emphasis on category name. Add category as filter to query. (i.e. only pos search for selected category) |
| POI | Switch to map view with results and centre on POI marker corresponding with tapped POI result. Open map context balloon. |

Described below is the display of the results and suggestions according to an embodiment.

Preferably the combined search results and generated suggestions based on the search string are presented in the user input view 810 and list view 820 of the user interface in two columns:

1. Addresses column 813 contains addresses (street+city from map+recent destinations), city matches and aggregated street name suggestions
2. POI column 814 contains POI names, POI addresses, 3rd party POI files (e.g. .ov2 files or .csv files), favourites (name+address), POI category suggestions Preferably, a minimum of four GUI elements carrying two lines of information should be made to fit in the available vertical space. Some may be obscured by the keyboard showing on the bottom in input view 810. Results are ranked in order of ranking score per column.

Closing the keyboard with the list view/hide keyboard toggle button 815 the whole result list, limited to 50 navigable results (address and POIs combined) and other suggestion types mixed in.

Figure 9:
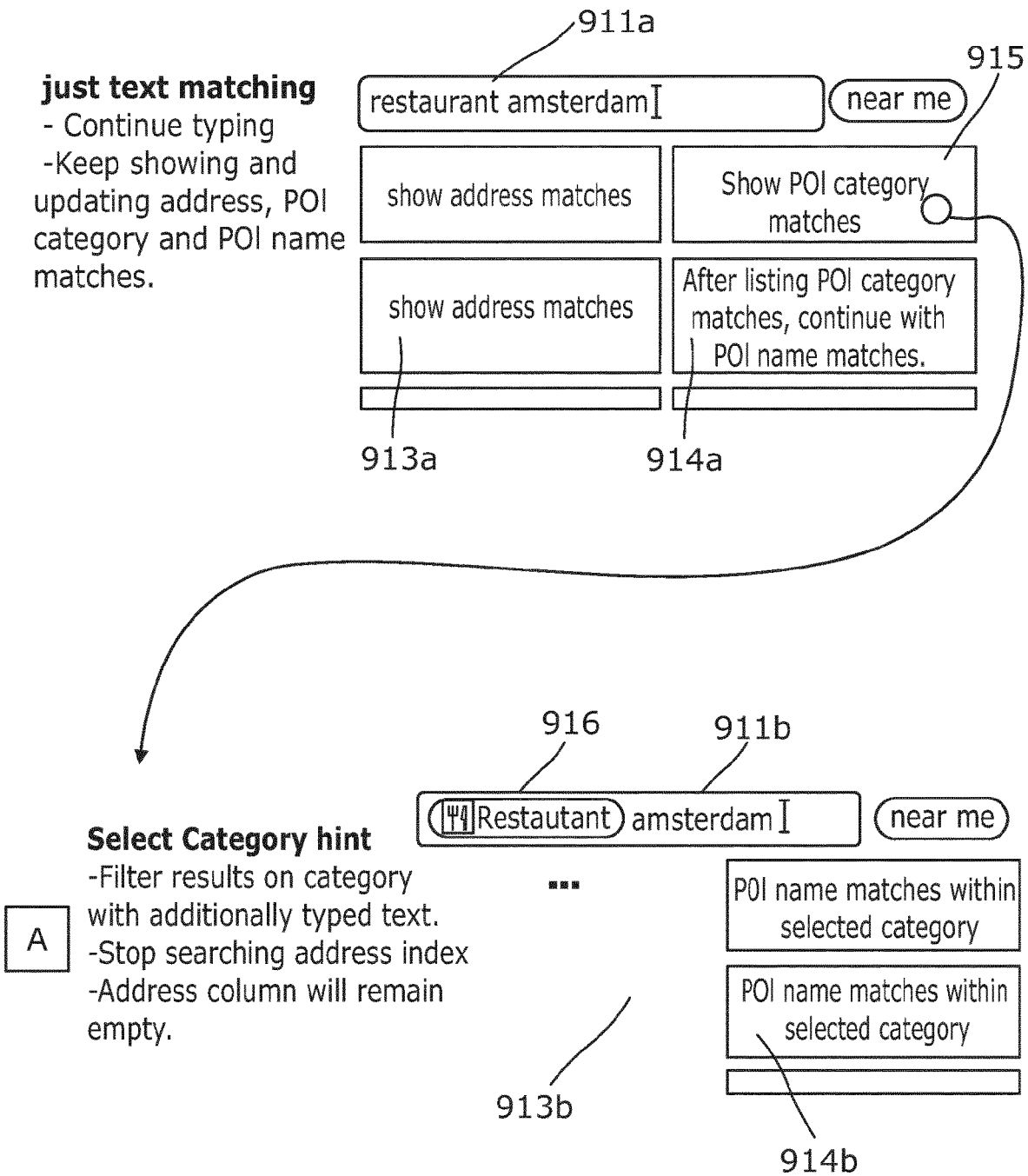
FIG. 9 is a user input view of the user interface that is displayed in an embodiment.

Referring now to FIG. 9, a specific example of the operation of the exemplary device will now be described where a POI category suggestion is generated and used in a search.

In FIG. 9, the user input view of the user interface is displayed in which the user has input into user input box 911a the search string "restaurant amsterdam". Search results and suggestions are shown below the user input box 911a in the address column 913a and POI column 914a. A user selection of a POI category suggestion "restaurant" 915 generated based on the search string causes the POI category to be added as a filter to the search query, the filter being shown as a GUI element 916 to the left of the search input box 911b. As a result of the selection of the POI category suggestion, the address records are filtered out as they do not correspond to POIs and so lack a POI category component or entry, thus column 913b is empty. Column 914b, on the other hand, shows POI record matches within the filtered category.

Figure 10:
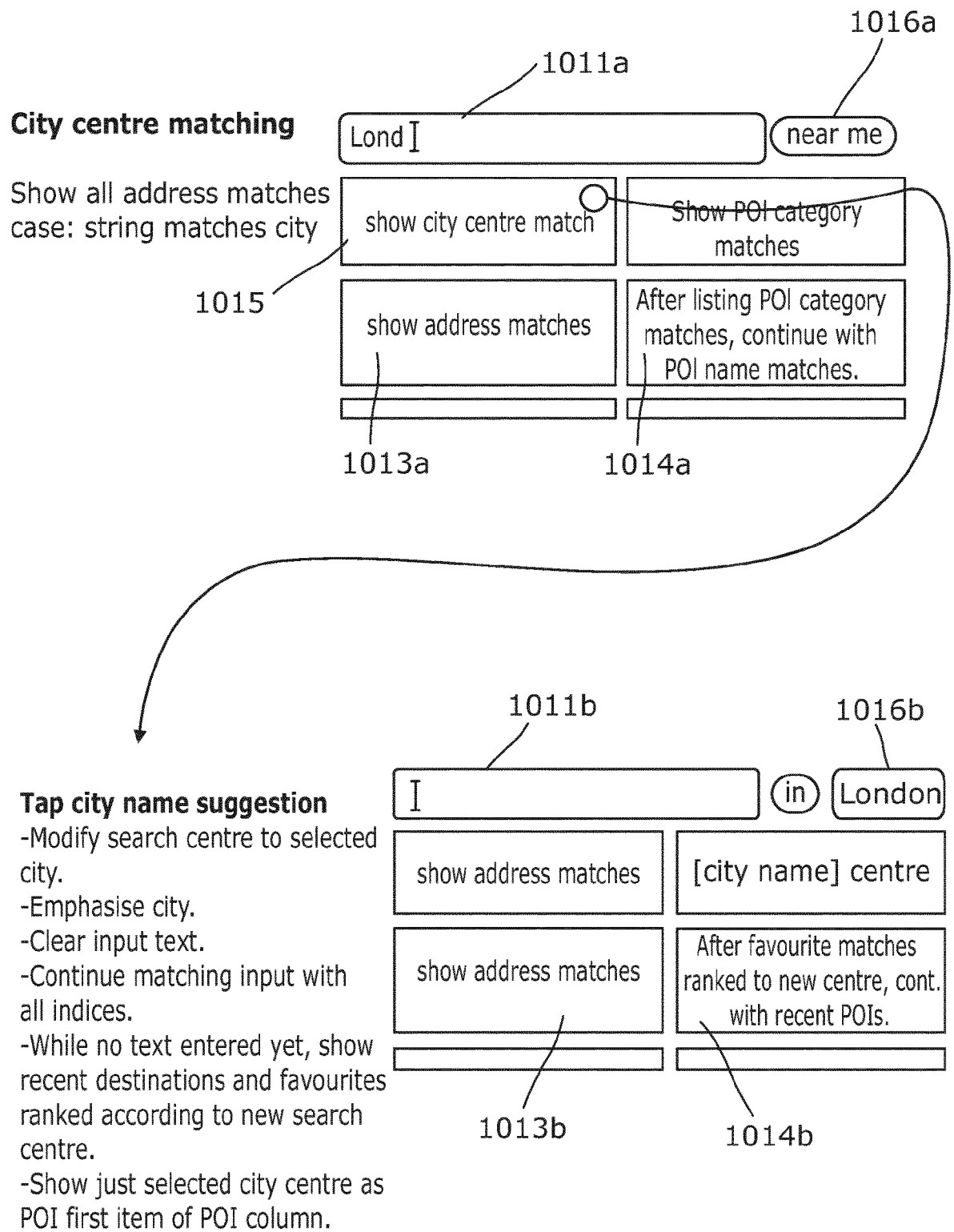
FIG. 10 is a user input view of the user interface that is displayed in an embodiment.

Referring now to FIG. 10, a specific example of the operation of the exemplary device will now be described where an city suggestion is generated and used in a search.

In FIG. 10, the user input view of the user interface is displayed in which the user has input into user input box 1011a the search string "Lond". Ranked search results and suggestions are shown below the user input box 1011a in the address column 1013a and POI column 1014a. This includes partial word matches and the city suggestion 1015 for "London" is generated based on the search string and appears in column 1013a. A user selection of the city suggestion 1015 causes the user input to be cleared (of at least the matching word) from input box 1011b and the search centre is changed from "near me" as in 1016a to "in London" as in 1016b. As a result of the selection of the city suggestion, the address and POI records shown in columns 1013b and 1014b are ranked based on London as a search centre. As the user input box 1011b in FIG. 10 is empty, the default records are again shown in columns 1013b and 1014b, ranked this time with London as the search centre. Entry of further text input into input box 1011b causes address and POI records matching that input and suggestions based on that input to be displayed in columns 1013b and 1014b ranked with London as the search centre.

Figure 11:
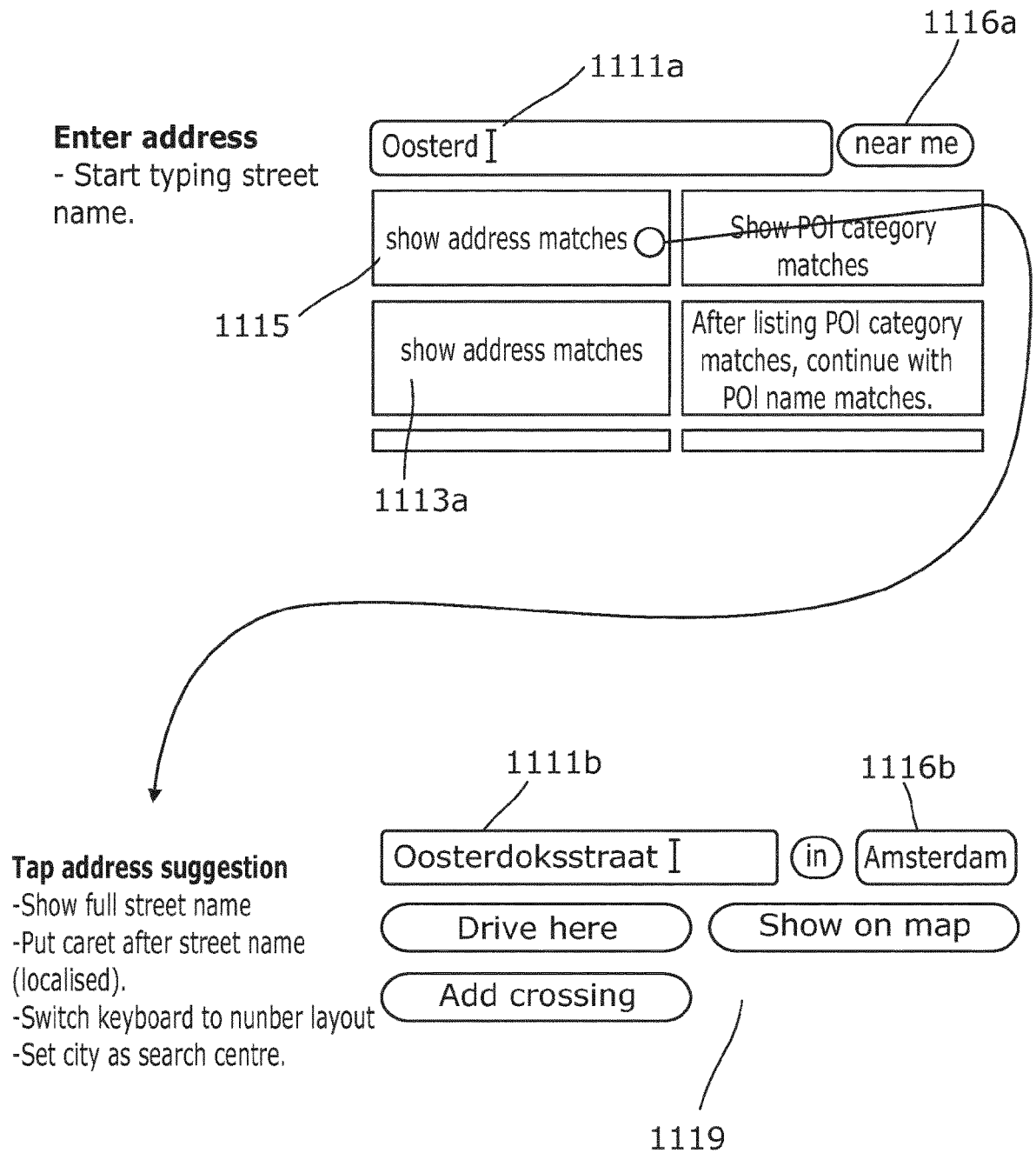
FIG. 11 is a user input view of the user interface that is displayed in an embodiment.

Referring now to FIG. 11, a specific example of the operation of the exemplary device will now be described where an address suggestion is generated and used in a search.

In FIG. 11, the user input view of the user interface is displayed in which the user has input into user input box 1111a the search string "oosterd". Ranked search results and suggestions are shown below the user input box 1111a in the address column 1113a and POI column 1114a. This includes partial word matches and suggestions based on the search string. As the search string partially matches plural address records on Oosterdoksstraat in Amsterdam, a partial address suggestion 1115 for "Oosterdoksstraat in Amsterdam" is generated based on the search string and appears in column 1113a. A user selection of the partial address suggestion 1115 causes the full street name "Oosterdoksstraat" to be inserted into the input box 1111b to the left of the caret to form part of the search string and the search centre to be changed from "near me" as in 1116a to "in Amsterdam" as in 1116b. Preferably, as a result of the selection of a partial address suggestion down to specific street level, the columns 1113a and 1114a are removed such that search results and suggestions are no longer displayed (the rationale being that the search is now specific enough). Instead, the keyboard is changed to number layout to allow the user to insert a house number and a number of address-specific suggestions 1119 are shown including "drive here" (i.e. route to street with/without a house number), "add crossing" (useful if, e.g. the house number is not known) and "view on map". On the other hand, if the address suggestion matches plural streets, the search results and suggestions may continue to be shown in columns 1113 and 1114.

Map View

Embodiments of aspects of the invention provide an electronic device such as navigation device 200, and a method and computer software product for operating a navigation device 200 for providing, on a representation of a digital map displayed on the display, GUI elements of different prominence levels to facilitate a user in reviewing a plurality of locations. The plurality of locations may represent, for example, a set of results of a destination search such as the above-described free text search using suggestions. The plurality of locations may also represent a set of current traffic events, weather events, and so forth.

By providing, on a representation of a digital map displayed on the display, GUI elements of different prominence levels to represent a plurality of locations, the user is facilitated in reviewing those locations on a digital map.

In an exemplary embodiment, device 200 stores in memory 230 data representative of a digital map and a computer program product which causes the electronic device, in relation to data representative of a plurality locations (such as search results) relevant to the digital map, to: provide, on a representation of the digital map displayed on the display such as in map view 830, for each of the locations, one of a plurality of different graphical user interface (GUI) elements characterised by different prominence levels to indicate the locations. The prominence level of the GUI element used for each location is dependent on the level of detail at which the digital map is displayed and a deemed relevance of that location to a user query.

The selection of GUI elements to indicated locations based on a displayed level of detail of the digital map and a deemed relevance of the location to a user query greatly enhances a user's ability to digest information and understand the relevance of the different locations to his query in a map view. It also facilitates a user's ability to intuitively interact with the map view of potentially a very large number of locations. In particular, use of decreasing prominence levels allows a large number of search results to be shown on a map view in a non-confusing and non-congested way. An exemplary map view produced in accordance with the embodiment is shown in FIG. 12, in which the navigable results of a free text search are shown in the map view.

Figure 12:
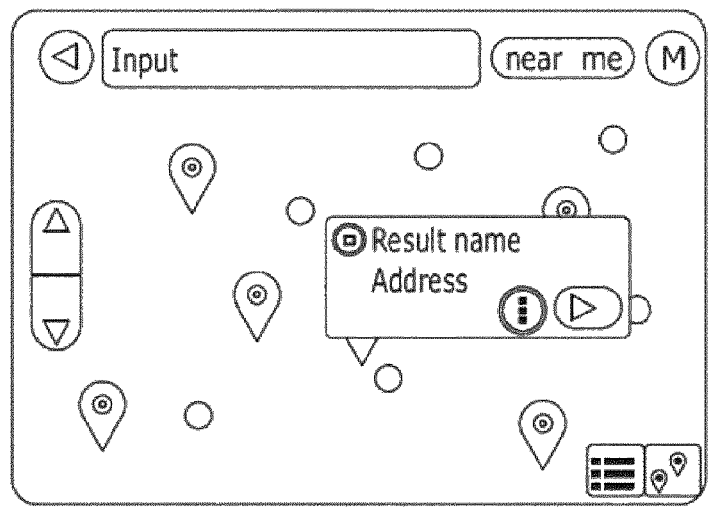
FIG. 12 is a map view of navigable results of a free text search according to an embodiment.

It can be seen from FIG. 12 that GUI elements at increased prominence levels provide one or more of: increased visual prominence in the display; increased opacity; increased information relevant to the location; increased user interface functionality enabling user interaction therewith. For example, as shown in FIG. 12, an exemplary range of GUI elements from least to most prominent, is: semi-transparent dot, less transparent dot, opaque dot, marker, bold marker. Increasing prominence levels may provide increasing levels of interactivity. For example, only the three most prominent GUI elements may be selectable by a user to display further information about the search results indicated thereby, while only the two most prominent GUI element may also be selectable to provide selectable functions to the user.

The locations may be divided into groups by their relevance to the user query, and each group may be associated with a respective level of detail for the digital map. The grouping of the locations and the assignation of the associated respective levels of details to those groups may be performed based on one or more of: the number of the locations; the distribution of the locations; the deemed relevance of the locations to the user query; the level of detail required to contain possible groupings of the locations in a minimum bounding box; the range of levels of detail to the maximum possible; a set number of locations in the most relevant group; a set number of groups; a set number of locations in each group.

In the example, fifty navigable locations returned by a free text search are divided into five equal groups spread over a range of rankings or scores. In this case, each group is chosen to be equal in size, i.e. containing ten locations. However, another advantageous grouping size and apportionment may be adopted.

Each group, from most to least relevant, is then associated with progressively higher levels of detail. A base level of detail for the digital map (in which the map view 830 is initially displayed on selecting toggle button 818) is defined based on a minimum bounding box containing the locations of the most relevant group of locations. Thus in the example, the bounding box which displays the ten results of the first group is initially displayed in map view 830 and the commensurate level of detail that is shown for the zoom level of the digital map for that map view is set as the base level of detail that is associated with the most relevant group. At higher zoom levels, typically, a higher level of detail of the digital map is shown.

For example, if the most relevant group of results consists of ten results in a single street, the map is shown initially zoomed in bounding those ten results on that street, showing the highest detail level, with each of the most relevant results in the street shown with ten markers with any other results on the street shown as dots. Similarly, if the most relevant group consisted of ten results spread across Europe, then the map would be shown initially zoomed out bounding those results in in the lowest detail level, showing the first 10 results as markers and the rest as dots.

Each group of locations of decreasing relevance is then associated with increasing levels of detail compared to the base level of detail. The map may be displayed initially at the base level of detail, and locations belonging to groups associated with higher levels of detail than the base level of detail may be indicated with GUI elements having progressively lower prominence levels for progressively less relevant groups.

In the example, when the map is displayed at the base level of detail, the five different GUI elements of may be used to indicate the locations of the five groups of ten search results as follows:

Group of results ranked 50-41—semi-transparent dot
Group of results ranked 40-31—a less transparent dot
Group of results ranked 30-21—opaque dot
Group of results ranked 20-11—marker
Group of results ranked 10-1—bold marker Thus, at a given level of detail, such as the base level of detail, GUI elements having a relatively low prominence level are used to indicate locations of the plurality of locations deemed less relevant to the user query, whereas GUI elements having a relatively high prominence level are used to indicate locations of the plurality of locations deemed more relevant to the user query.

Also, when the digital map is displayed at a given level of detail, locations belonging to groups associated with higher levels of detail than the displayed level of detail are indicated with GUI elements having progressively lower prominence levels for progressively less relevant groups.

When the level of detail at which the digital map is displayed is increased or decreased, the GUI element used to indicate a given location may be changed to an available higher or lower prominence level, respectively.

For example, when, in response to user input, the digital map is zoomed from a start level of detail to an end level of detail associated with the next more relevant group, the GUI elements used to indicate the locations of each group may be increased to the next available prominence level. In the example above, zooming the map in from the initial view (at the base level of detail) such that the digital map is shown at the level of detail associated with the group of results ranked 20-11, would cause the groups of locations to be indicated on the map using the GUI elements as follows:

Group of results ranked 50-41—less transparent dot
Group of results ranked 40-31—opaque dot
Group of results ranked 30-21—marker
Group of results ranked 20-11—bold marker
Group of results ranked 10-1—bold marker Note that locations belonging to groups associated with levels of detail lower than the displayed level of detail may be indicated with the GUI element having the highest prominence level. In the above example, both the groups of results ranked 20-11 and 10-1 are indicated using a bold marker.

The result is that, as the map is zoomed in and higher levels of detail are shown, more of the search results are indicated more prominently. This is mitigated, however, by fewer of the search results being visible. Of course, non-visible search results may become visible if the map is then panned by dragging or swiping on the touch screen. Panning and zooming the map view does not affect the search query or the displayed results—these remain the same.

Similarly, when, in response to user input, the digital map is zoomed from a start level of detail to an end level of detail associated with the next less relevant group, the GUI elements used to indicate the locations of each group may be decreased to the next available prominence level. In the example above, zooming the map out from the level of detail associated with the group of results 20-11 back to the base level of detail would cause the groups of locations to again be indicated on the map using the GUI elements that were used in the initial map view.

For any given level of detail, a minimum number of the plurality of locations may be indicated by the GUI element having the highest prominence level. For example, if the map is zoomed out from the base level of detail to an even lower level of detail, the most relevant group of results may still be indicated using the bold marker.

Figure 13:
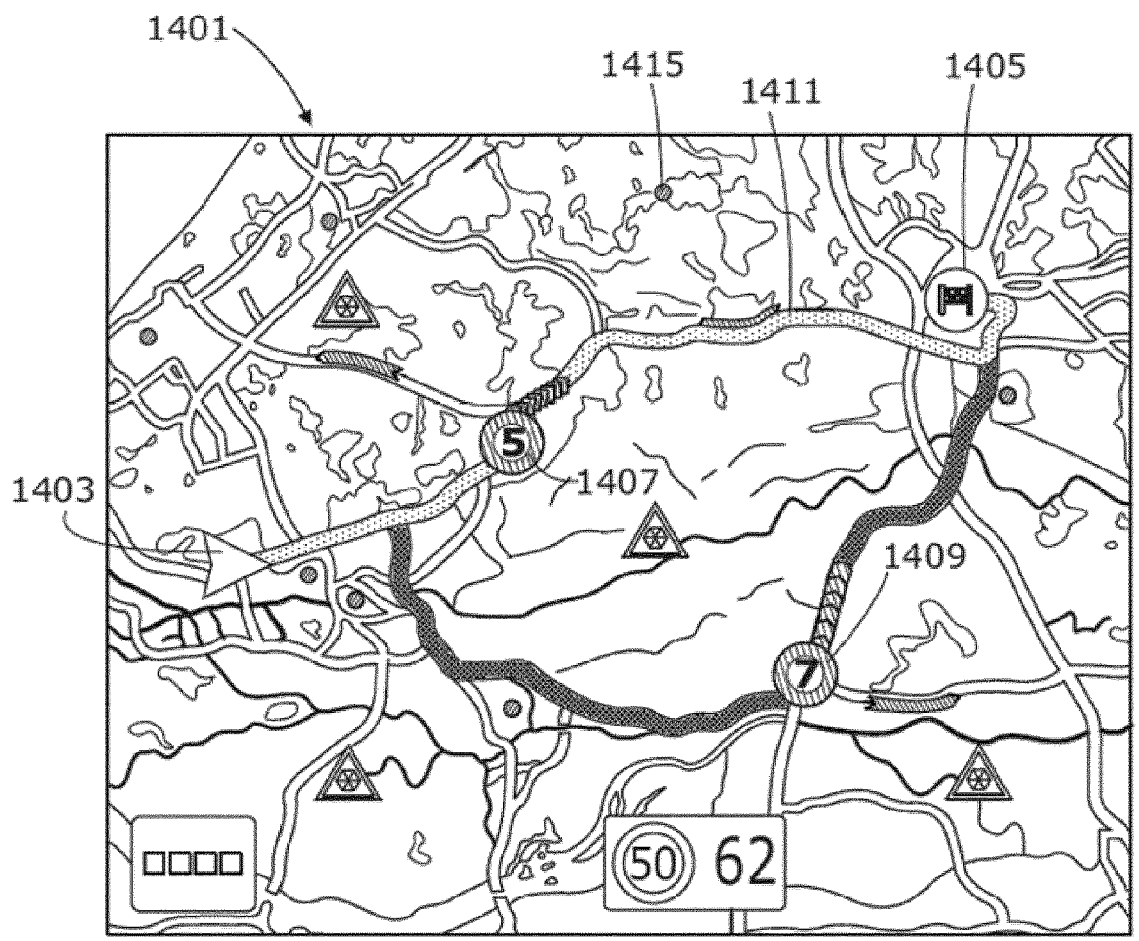
FIG. 13 is an illustration of a process of dividing the results of a free text search into groups according to relevance to a user query and associating those groups with levels of detail of a digital map, in accordance with an embodiment.

For a further illustration, FIG. 13 shows an exemplary division of a ranked list of the 100 results 1301 of a free text search into groups of 20 according to relevance to a user query and associating those groups with levels of detail of a digital map. The highest ranked group 1303a is associated with base levels of detail of the digital map from 14-17. The second highest ranked group 1303b is associated with levels of detail of the digital map from 10-13. The third highest ranked group 1303b is associated with levels of detail of the digital map from 7-9. The fourth and fifth highest ranked groups are omitted from this description, for brevity.

The view 1305a of the map shows the map at one of the base levels of detail (i.e. 14, 15, 16 or 17). Here, the locations of the results in the highest ranked group 1303a are indicated with an interactive marker, whereas the locations of the results in the second highest ranked group 1303b are indicated with a black opaque marker and the locations of the results in the third highest ranked group 1303c are indicated with a semi-opaque grey marker.

The view 1305b of the map shows the map zoomed in to a level of detail associated with the second highest ranked group 1303b (i.e. 10, 11, 12 or 13). As can be seen, the locations of the results in the highest ranked group 1303a and the second highest ranked group 1303b are now indicated with an interactive marker, whereas the locations of the results in the third highest ranked group 1303b are now indicated with a black opaque marker.

The view 1305c of the map shows the map zoomed in to a level of detail associated with the third highest ranked group 1303c (i.e. 7, 8 or 9). As can be seen, the locations of the results in the highest ranked group 1303a, the second highest ranked group 1303b and the third highest ranked group 1303c are now indicated with an interactive marker.

Of course, grouping of the locations is not necessary and the determination of which GUI element to use to indicate a location may be made in any other suitable way based on the level of detail of the map and the relevance of the location to a user query.

The locations may be representative of: destinations including one or more of addresses and points of interest; traffic events including one or more of accidents, delays, road closures, road works, restrictions, traffic volumes and closed lanes; and/or weather events including one or more of flooding, snow, ice, fog, adverse road conditions.

As described above, device 200 comprises a free text search engine and the plurality of locations may be navigable destinations including one or more of addresses and points of interest returned in response to processing of a free text search query.

The device 200 may further comprise a traffic event engine operable to return locations representative of current traffic events relevant to a user or device generated query. The traffic event query is for traffic events proximate to a search centre, a current location of the device or a route, or in a user-specified area of the digital map.

For example, when a user query is to display a map view showing traffic incidents, for example, affecting a route of a user, the above-described map view can be very valuable because traffic information available to the device 200 from the traffic engine may be very dense and rich, which would otherwise clutter the display. By using GUI elements selected to represent traffic incidents based on a level of detail in which the digital map is displayed, and the relevance of the traffic incident to the user query (e.g. impact on the user's route), the visualisation of that data on the map view can be uncluttered, easy to digest and intuitive for a user to understand and interact with.

Figure 14C:
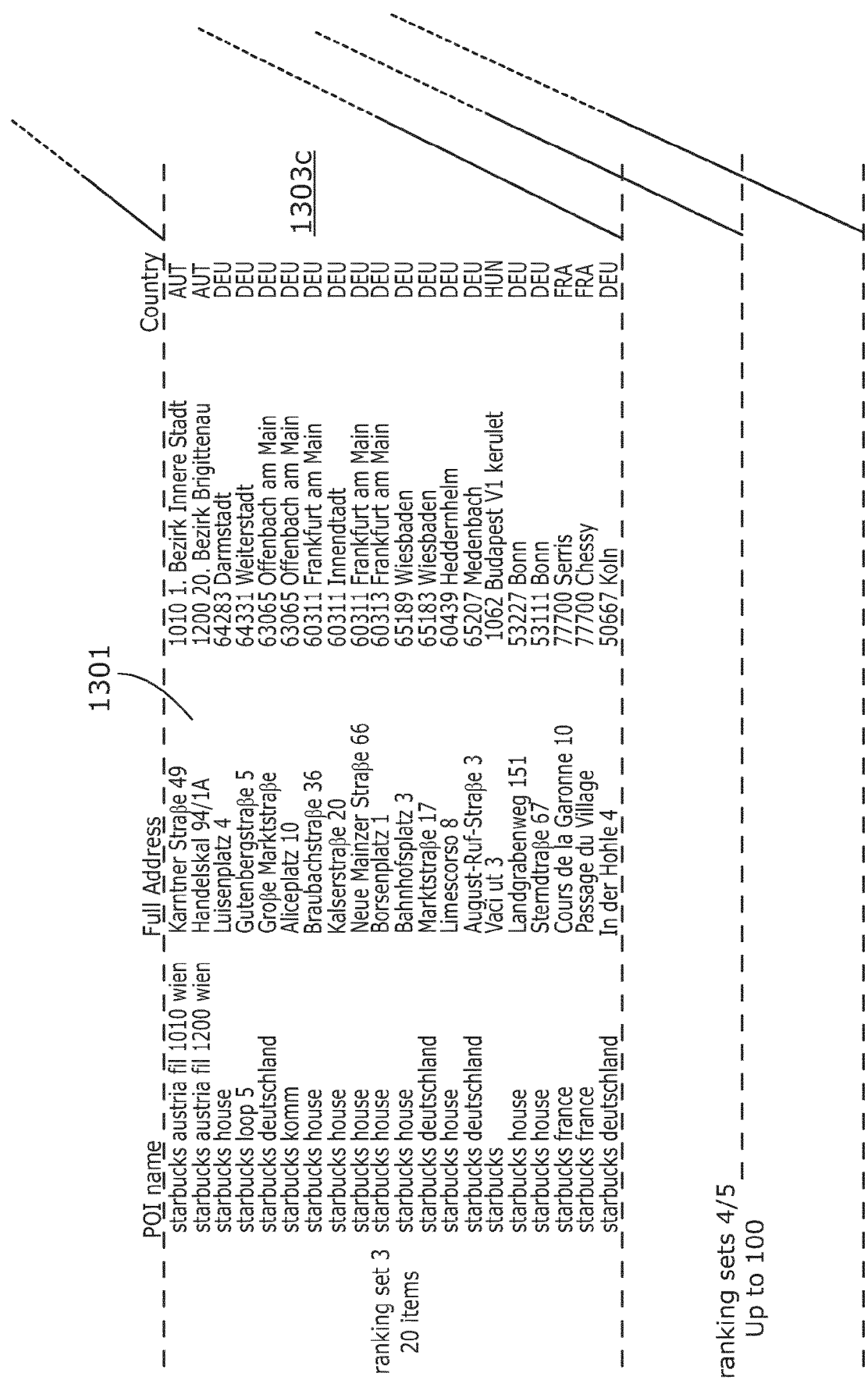
FIG. 14 is a map view 1401 of a user's route and a number of traffic incidents the locations of which are indicated using GUI elements, in accordance with an embodiment.
Figure 14D:
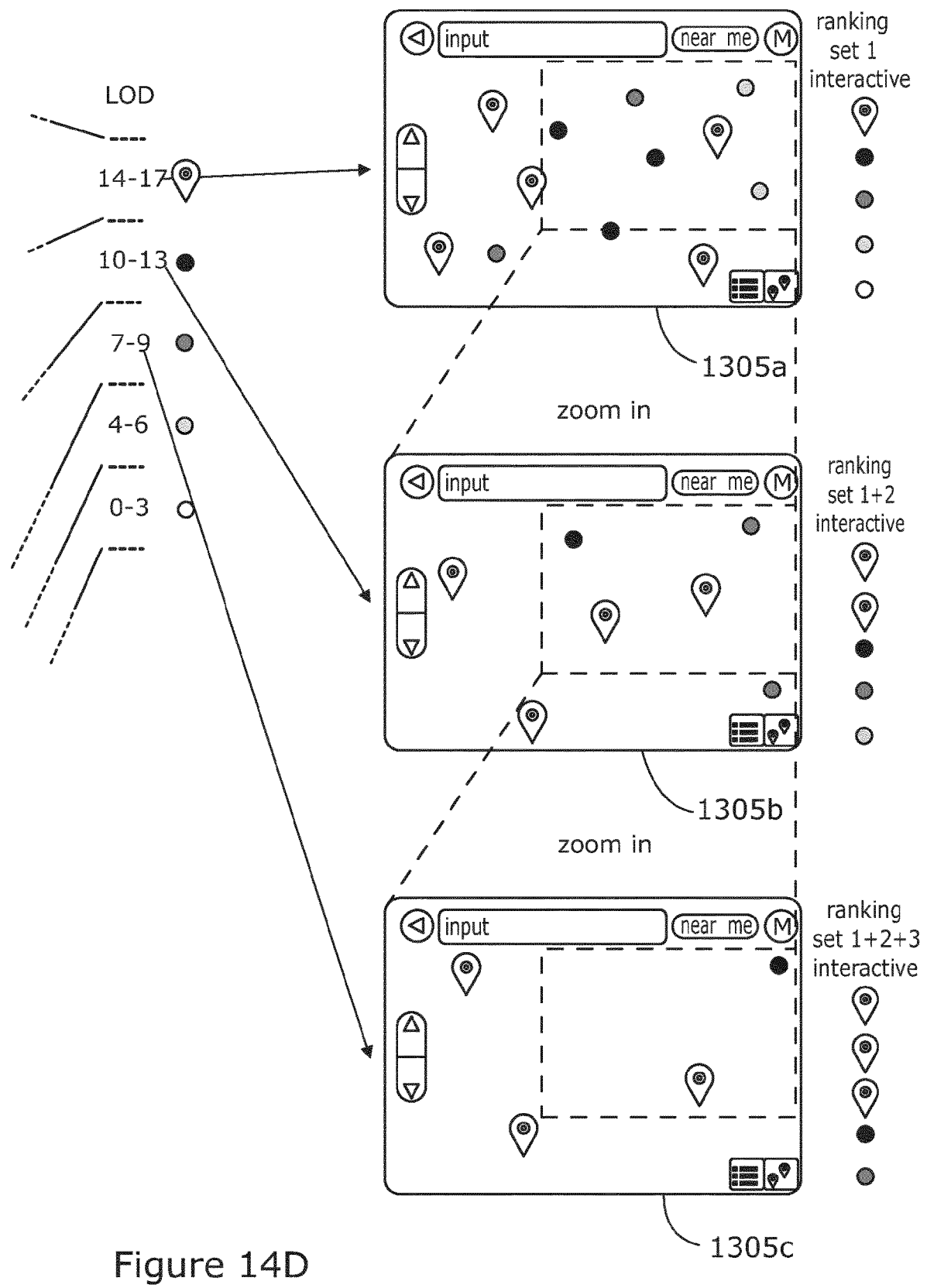

Referring now to FIG. 14, which shows a map view 1401 of a user's route from a start location 1403 to an destination 1405, and a number of traffic incidents the locations of which are indicated using GUI elements having different prominence levels selected dependent on the relevance of each incident to the user's route and the level of detail of the map view.

When looking at the map, the user should immediately understand which traffic incidents are important for his route. Therefore, traffic incidents that are affecting the route 1407, (or even an alternative route, 1409) are emphasized using more prominent GUI elements to indicate their location: these incidents are rendered on top of the route and show the delay time of the incident.

Other traffic incidents that are relevant to the route but not affecting the user (e.g. in the opposite direction) are rendered using a less prominent GUI element 1411 showing below the route. Traffic incidents on any road visible on the map at a given level of detail only as a single tube (i.e. no direction information), but which are not affecting the user's route, are indicated similarly using a GUI element 1413 showing below the road on the side of the road affected.

Traffic incidents on roads that are not visible in the viewed level of detail are indicated using still less prominent GUI elements 1415 such as opaque dots without any icon.

When the map is zoomed in to higher levels of detail, all traffic incidents change into more prominent GUI elements. As roads become visible as separate tubes for different directions, or become of a suitable width, the incidents may be displayed more prominently still using GUI elements on the road for the affected direction. Further, even opaque dots turn into GUI elements shown below roads or on roads as the roads become visible. When zoomed in to a suitably high level of detail, any delay associated with any incident will be shown.

Conversely, When zoomed out to lower levels of detail, however, all traffic incidents change progressively into less prominent GUI elements, for example, as the roads become invisible at given levels of detail, until all the traffic events are indicated by opaque dots.

The GUI elements used may be colour coded to indicate the category of incident.

Modifications and Variations

A number of modifications and variations of the implementation of a navigation device 200 described herein can be made without departing from embodiments of the invention as defined by the appended claims. For example, whilst embodiments described in the foregoing detailed description refer to GPS, it should be noted that the watch may utilise any kind of position sensing technology as an alternative to (or indeed in addition to) GPS. For example, the device may utilise other global navigation satellite systems, such as the European Galileo system. Equally, it is not limited to satellite-based systems, but could readily function using ground-based beacons or other kind of system that enables the watch to determine its geographic location.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims. Furthermore, the figures and descriptions thereof herein should not be understood to prescribe a fixed order of performing the method steps described. Rather, the method steps may be performed in any order that is practicable.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A portable electronic device comprising:
one or more processors;
data repository containing data records representative of locations relevant to or within a digital map;
display means; and
computer readable medium comprising instructions for facilitating a user in searching the data records which when executed by the one or more processors cause the electronic device to:
monitor a free text search string as it is input by a user of the device;
based on the search string as it is input:
query the data repository for matching records; and
generate suggestions selectable by a user to adjust the search;
display, in a search view in a user interface displayed on the display means, at least some of any matching records and suggestions, the displaying comprising displaying an address column and a point of interest (POI) column, comprising, respectively, matching address suggestions and/or records and matching POI suggestions and/or records; and
in response to receipt of user input indicating a selection of a matching record or suggestion:
select, based on a type of the matching record or suggestion, at least one of the address column and the POI column in which to subsequently display suggestions and/or records in the search view; and
update the search view to display address or POI suggestions and/or records, respectively, in the at least one of the address column and the POI column displayed in the search view, wherein suggestions and/or records are not displayed in the address column or the POI column when the address column or the POI column is not selected, and wherein the address and/or POI suggestions and/or records are filtered based on the matching record or suggestion.

2. A portable electronic device as claimed in claim 1, wherein address suggestions are generated based on the street and/or settlement names of data records representing addresses matched with the search string.

3. A portable electronic device as claimed in claim 2, wherein selection of an address suggestion containing a settlement name adjusts the search centre to correspond to that settlement.

4. A portable electronic device as claimed in claim 2, wherein selection of an address suggestion containing a street name replaces the search string with the street name.

5. A portable electronic device as claimed in claim 1, wherein POI suggestions are generated based on the names, categories and synonyms of categories of data records representing POIs matched with the search string.

6. A portable electronic device as claimed in claim 5, wherein selection of a POI suggestion filters the data records returned by the query to include only those having a POI name, category or synonymous category matching that of the POI suggestion.

7. A portable electronic device as claimed in claim 1, wherein the data repository is queried for matching data records and suggestions are generated in response to each keystroke or other user input to adapt the search string or search centre, and each selection of a suggestion, the display being thereafter updated to display any matching data records and generated suggestions.

8. A portable electronic device as claimed in claim 1, wherein the data repository further includes data representative of an index associating words contained in the data records with the records in which those words appear, wherein the instructions further cause the electronic device to process the search string as it is input to provide one or more search words, and wherein, based on the search string as it is input, querying the data repository for matching records includes querying the index to identify data records containing the or each search word.

9. A portable electronic device as claimed in claim 8, the instructions further causing the electronic device to generate a rank for each of the one or more identified data records indicative of the relevance of each identified data record to the search query, and wherein the matching data records are displayed in an ordered list according to said rank.

10. A portable electronic device as claimed in claim 8, wherein the instructions further cause the electronic device, when processing the search string, to perform one or more of:
 splitting the search string into words;
 normalising the words; and
 identifying and treating special words.

11. A portable electronic device as claimed in claim 8, wherein the instructions further cause the electronic device, when querying the index to identify data records containing the or each search word, to:
 for each search word, find the set of matching records from the index; and
 determine the intersection of the sets of records to provide the records that match all words.

12. A portable electronic device as claimed in claim 8, wherein the instructions further cause the electronic device, when generating a rank for each data record, to:
 calculate a score for each record;
 rank the records based on their scores; and
 if two records have the same score, reconcile their rank ordering based on a distance from a search centre if available, otherwise the rank order of the two records is random.

13. A portable electronic device as claimed in claim 1, wherein the data records contain one or more components, a location reference relevant to a location on a digital map, and a record identifier.

14. A portable electronic device as claimed in claim 1, wherein each data record represents either an address or a POI.

15. A portable electronic device as claimed in claim 14, wherein the data records contain one or more of the following components: street name; place name; postal code; country code; POI name; POI brand name; POI address; POI category code.

16. A portable electronic device as claimed in claim 1, further comprising a user input device including a touch screen overlay on said display, wherein selection of a displayed record returned by the query of the data records or of a generated suggestion comprises a touch in relation to the displayed record or suggestion or a GUI element representative thereof.

17. A portable electronic device as claimed in claim 1, wherein the data records contain a location reference representative of at least one of a region of a digital map and a record identifier, wherein the record identifier comprises a first portion and a second portion: the first portion being the location reference; and the second portion being a reference or pointer to information associated with the location of the data record in the digital map.

18. A method of operating a portable electronic device comprising one or more processors, data repository containing data records representative of locations relevant to a digital map, and display means, the method comprising:
 monitoring a free text search string as it is input by a user of the device; based on the search string as it is input:
  querying the data repository for matching records; and
  generating suggestions selectable by a user to adjust the search;
 displaying, in a search view in a user interface displayed on the display means, at least some of any matching records and suggestions, the displaying comprising displaying an address column and a point of interest (POI) column, comprising, respectively, matching address suggestions and/or records and matching POI suggestions and/or records; and
 in response to receiving a user input indicating a selection of a matching record or suggestion:
  selecting, based on a type of the matching record or suggestion, at least one of the address column and the POI column in which to subsequently display suggestions and/or records in the search view; and
  updating the search view to display address or POI suggestions and/or records, respectively, in the at least one of the address column and the POI column displayed in the search view, wherein suggestions and/or records are not displayed in the address column or the POI column when the address column or the POI column is not selected, and wherein the address and/or POI suggestions and/or records are filtered based on the matching record or suggestion.

19. A non-transitory computer readable medium comprising instructions which, when executed by one or more processors of a portable electronic device comprising the one or more processors, a data repository containing data records representative of locations relevant to a digital map, and a display means, cause the electronic device to perform a method comprising:
 monitoring a free text search string as it is input by a user of the device;
 based on the search string as it is input:
  querying the data repository for matching records; and
  generating suggestions selectable by a user to adjust the search;
 displaying, in a search view in a user interface displayed on the display means, at least some of any matching records and suggestions, the displaying comprising displaying an address column and a point of interest (POI) column, comprising, respectively, matching address suggestions and/or records and matching POI suggestions and/or records; and in response to receiving a user input indicating a selection of a matching record or suggestion:
  selecting, based on a type of the matching record or suggestion, at least one of the address column and the POI column in which to subsequently display suggestions and/or records in the search view; and
  updating the search view to display address or POI suggestions and/or records, respectively, in the at least one of the address column and the POI column displayed in the search view, wherein suggestions and/or records are not displayed in the address column or the POI column when the address column or the POI column is not selected, and wherein the address and/or POI suggestions and/or records are filtered based on the matching record or suggestion.

* * * * *